United States Patent [19]
Ohashi et al.

[11] Patent Number: 5,596,641
[45] Date of Patent: Jan. 21, 1997

[54] AUTHENTICATION METHOD FOR MOBILE COMMUNICATIONS

[75] Inventors: Masayoshi Ohashi; Yoshio Takeuchi, both of Saitama; Toshinori Suzuki, Tokyo; Akira Yamaguchi, Tokyo; Seiichiro Sakai, Tokyo; Toshio Mizuno, Saitama, all of Japan

[73] Assignee: Kokusai Denshin Denwa Co. Ltd., Tokyo, Japan

[21] Appl. No.: 404,290

[22] Filed: Mar. 14, 1995

[30] Foreign Application Priority Data

Mar. 17, 1994 [JP] Japan .................. 6-071252
Mar. 17, 1994 [JP] Japan .................. 6-071253
Dec. 5, 1994 [JP] Japan .................. 6-329214

[51] Int. Cl.$^6$ .................................................. H04L 9/00
[52] U.S. Cl. ........................ 380/23; 380/46; 379/58
[58] Field of Search ........................... 380/23, 4, 49, 380/46, 28; 379/58

[56] References Cited

U.S. PATENT DOCUMENTS

| | | | |
|---|---|---|---|
| 5,091,942 | 2/1992 | Dent | 380/46 |
| 5,204,902 | 4/1993 | Reeds et al. | 380/23 |
| 5,309,501 | 5/1994 | Kozik et al. | 379/58 |
| 5,329,573 | 7/1994 | Chang et al. | 379/58 |
| 5,455,863 | 10/1995 | Brown et al. | 380/23 |
| 5,537,474 | 7/1996 | Brown et al. | 380/23 |

*Primary Examiner*—David C. Cain
*Attorney, Agent, or Firm*—Nikaido, Marmelstein, Murray & Oram LLP

[57] ABSTRACT

In the preliminary authentication stage, the mobile station (35) is authenticated by sending from the home network (30) to the roamed network (31), a plurality of pairs of first random numbers ($RNDa_1, \ldots, RNDa_n$) and calculation results ($SRESa_1, \ldots, SRESa_n$) of the cipher function (f), which calculation is performed at the home network using the secret key (ki) and the first random numbers ($RNDa_1, \ldots, RND_{an}$), by sending, from the roamed network to the mobile station, third random numbers formed by coupling second random numbers ($RNDb_1, \ldots, RNDb_m$) produced at the roamed network with the first random numbers ($RNDa_1, \ldots, RNDan$), by sending, from the mobile station to the roamed network, calculation results ($SRESa_1, \ldots, SRESa_n, SRESb_1, \ldots, SRESb_m$)) of the cipher function (f), which calculation is performed at the mobile station using the secret key (ki) and the sent third random numbers, and by confirming, at the roamed network, coincidence of the calculation results ($SRESa_1, \ldots, SRESa_n$) sent from the mobile station with the calculation results ($SRESa_1, \ldots, SRESa_n$) sent from the home network. In the main authentication, the mobile station is authenticated by using a pair of the second random number ($RNDb_1, \ldots, RNDb_m$) and of the calculation result ($SRESb_1, \ldots, SRESb_m$) with respect to the second random number ($RNDb_1, \ldots, RNDb_m$), sent from the mobile station.

15 Claims, 25 Drawing Sheets

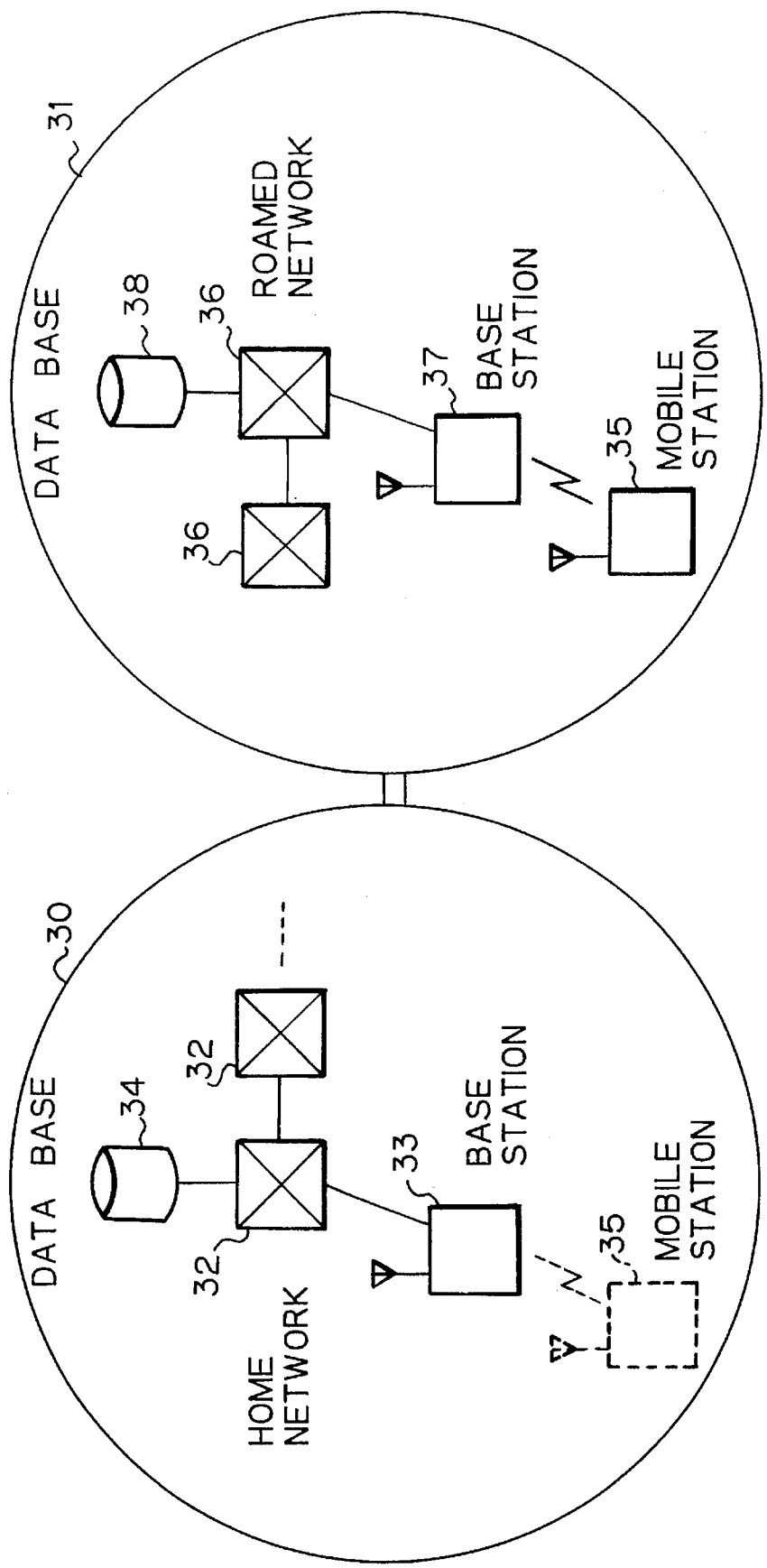

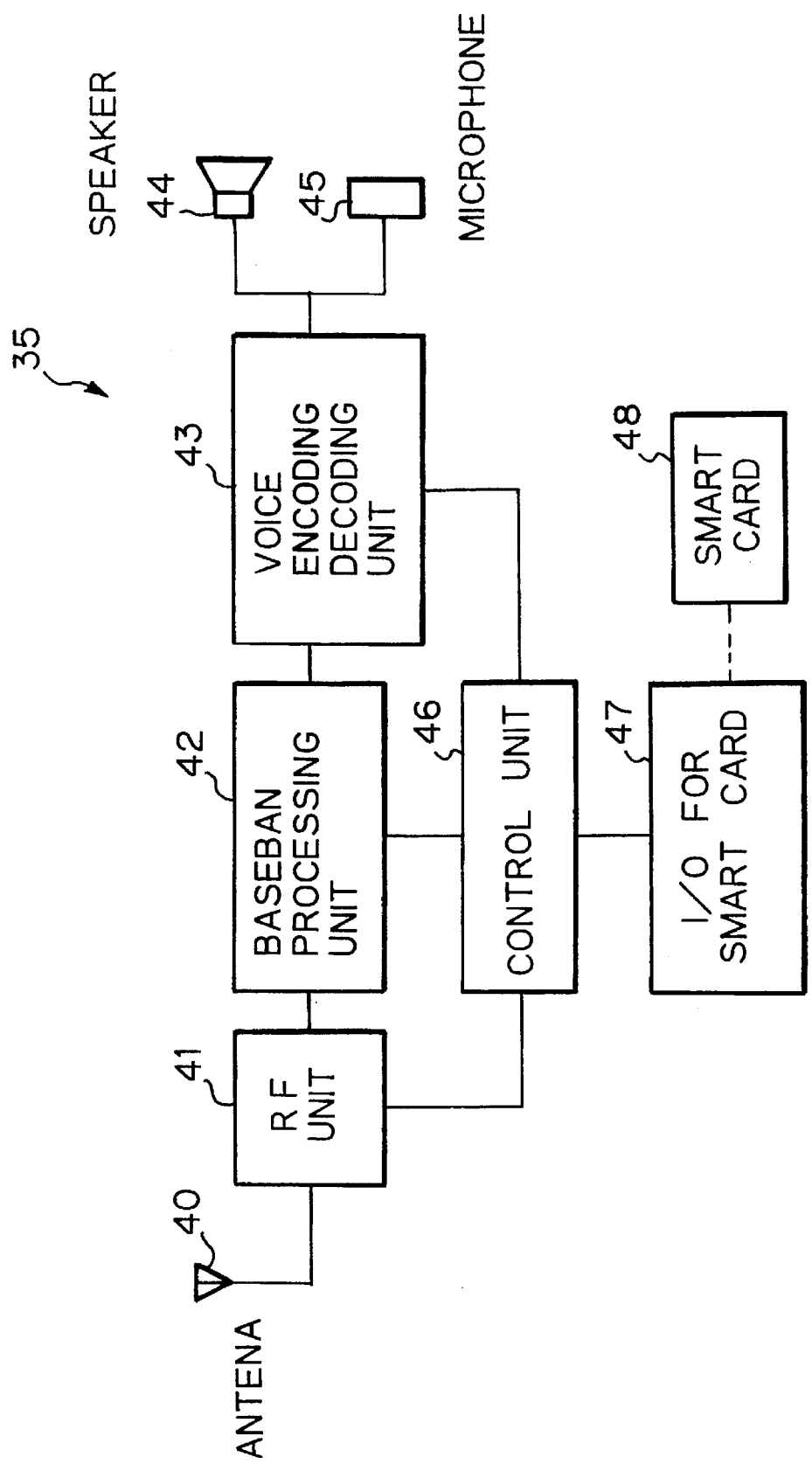

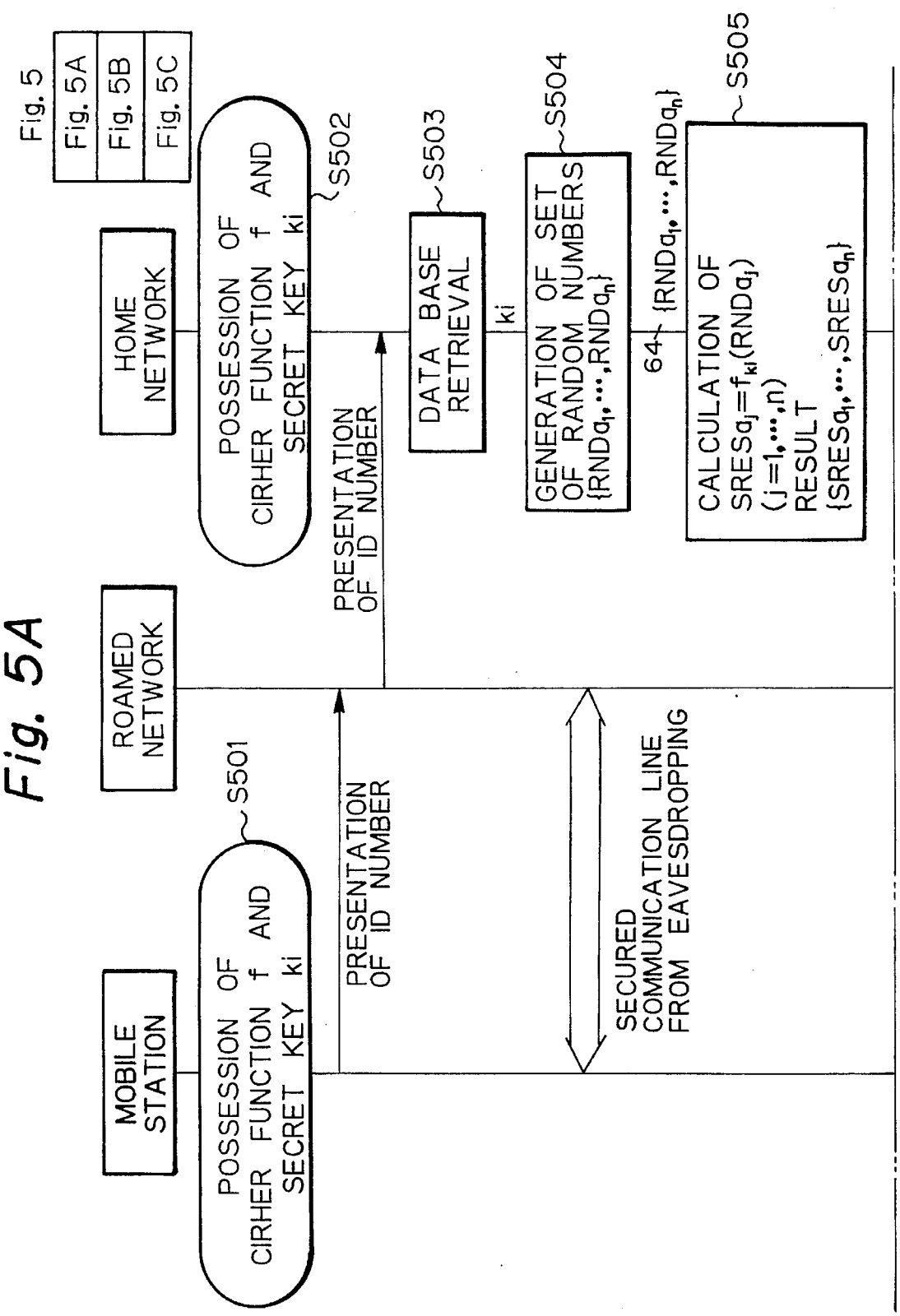

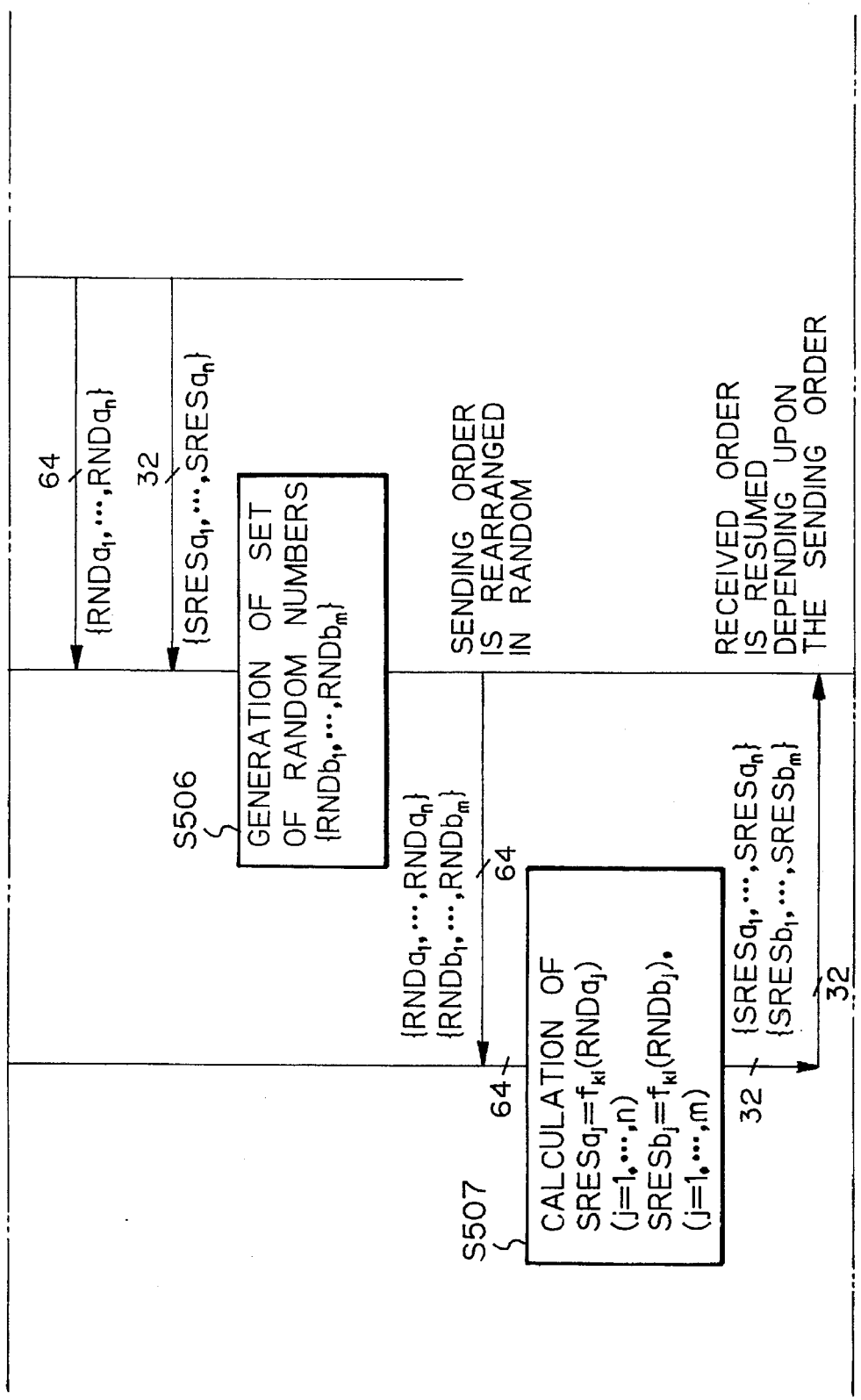

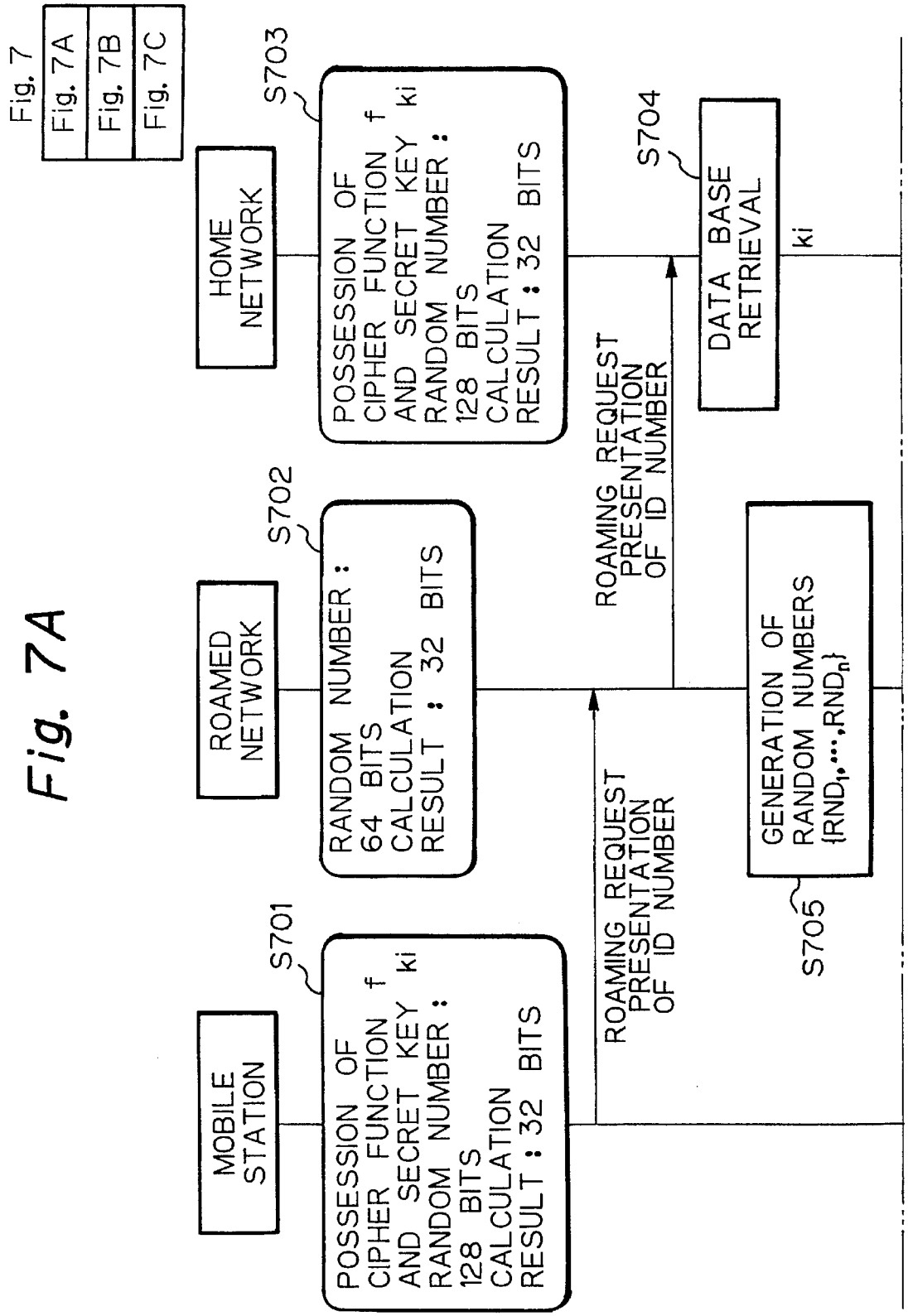

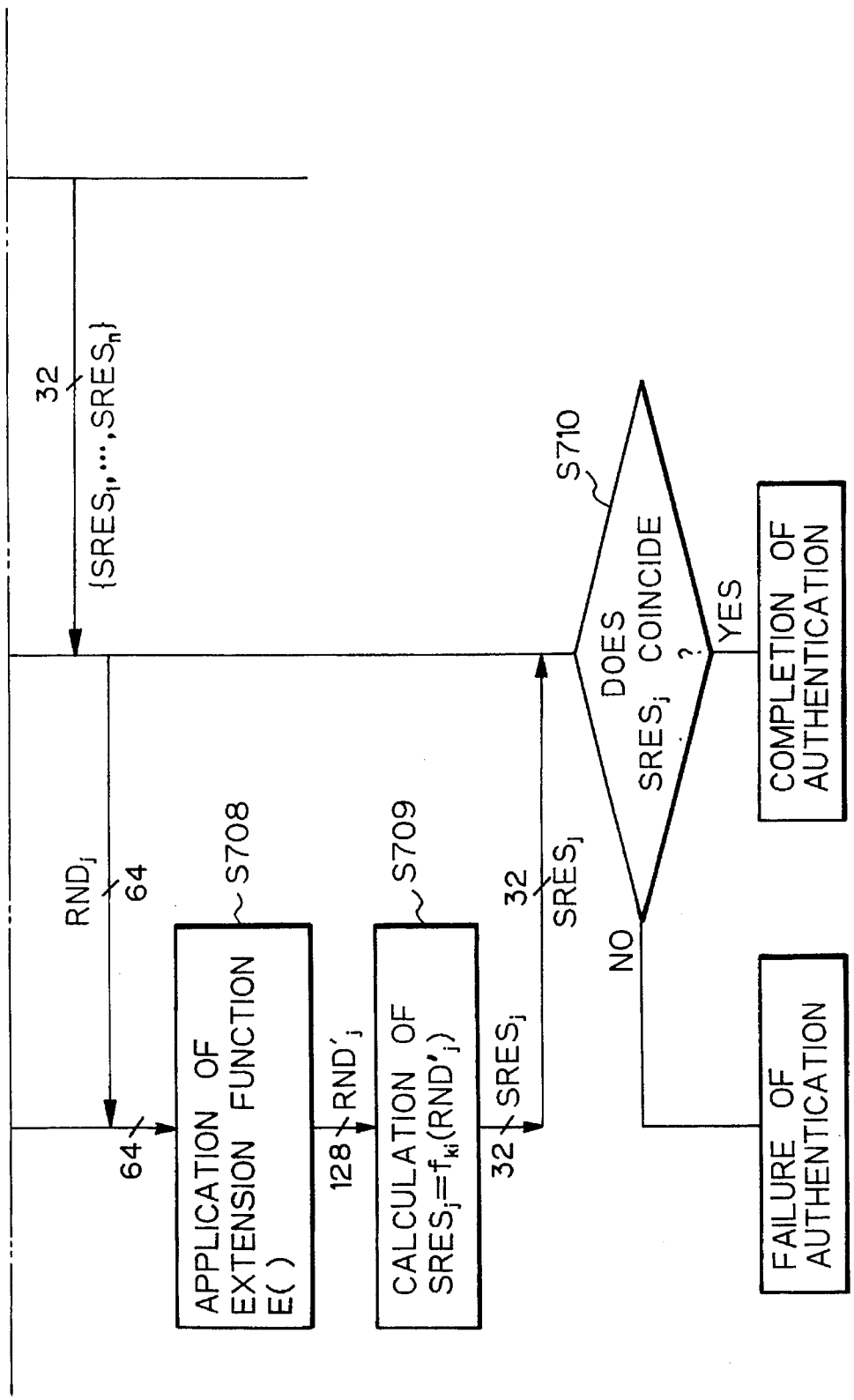

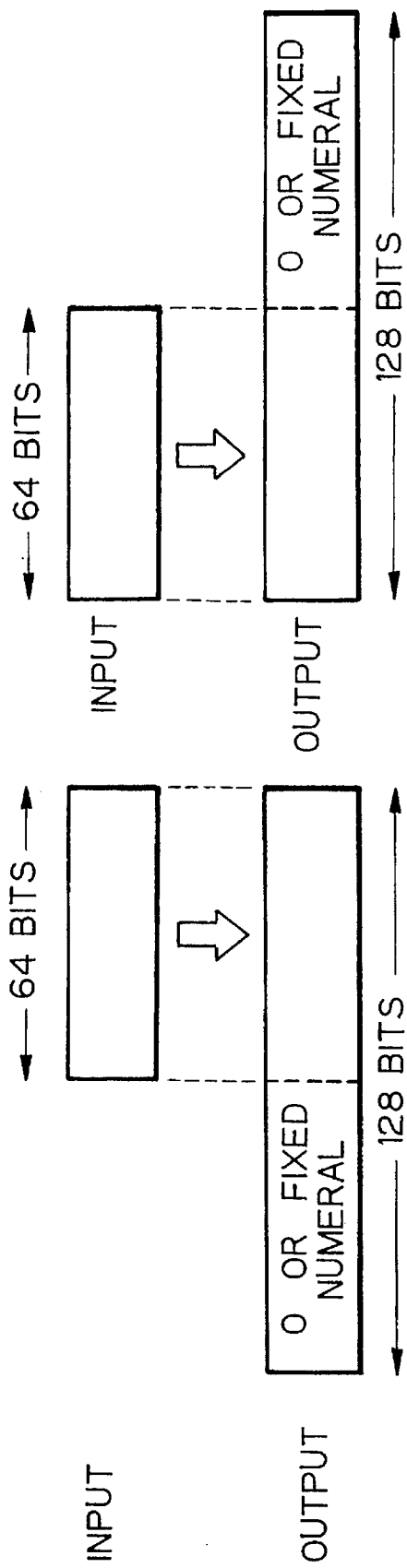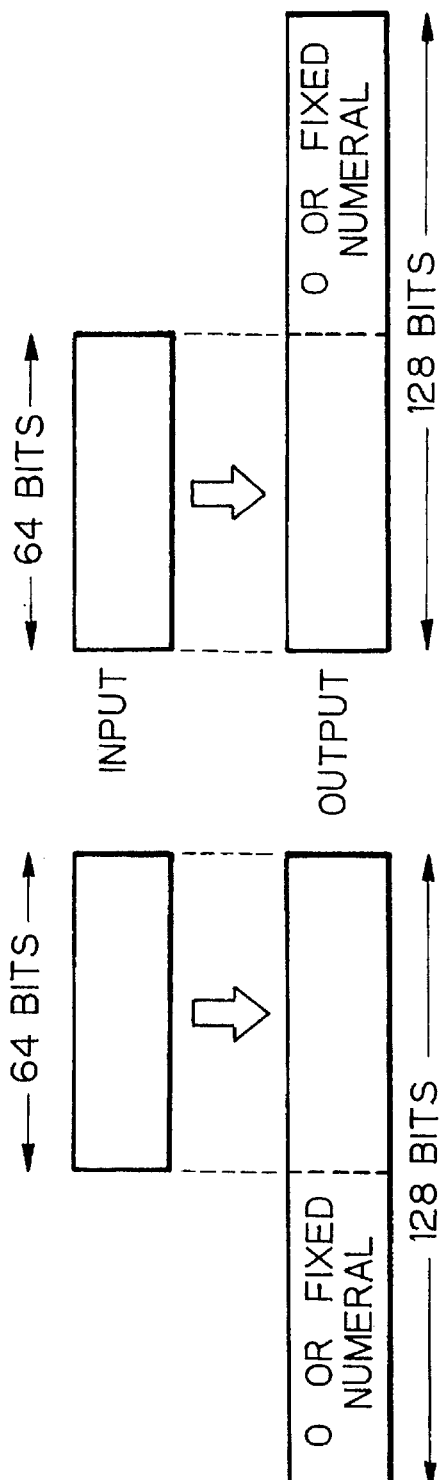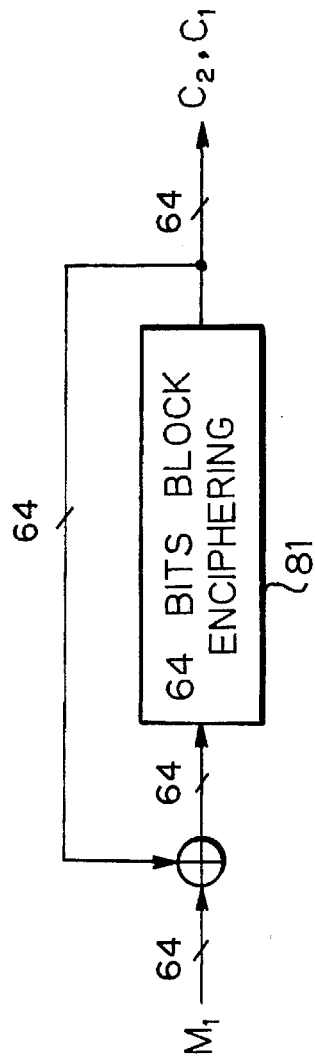
Fig. 8a
Fig. 8b
Fig. 8c

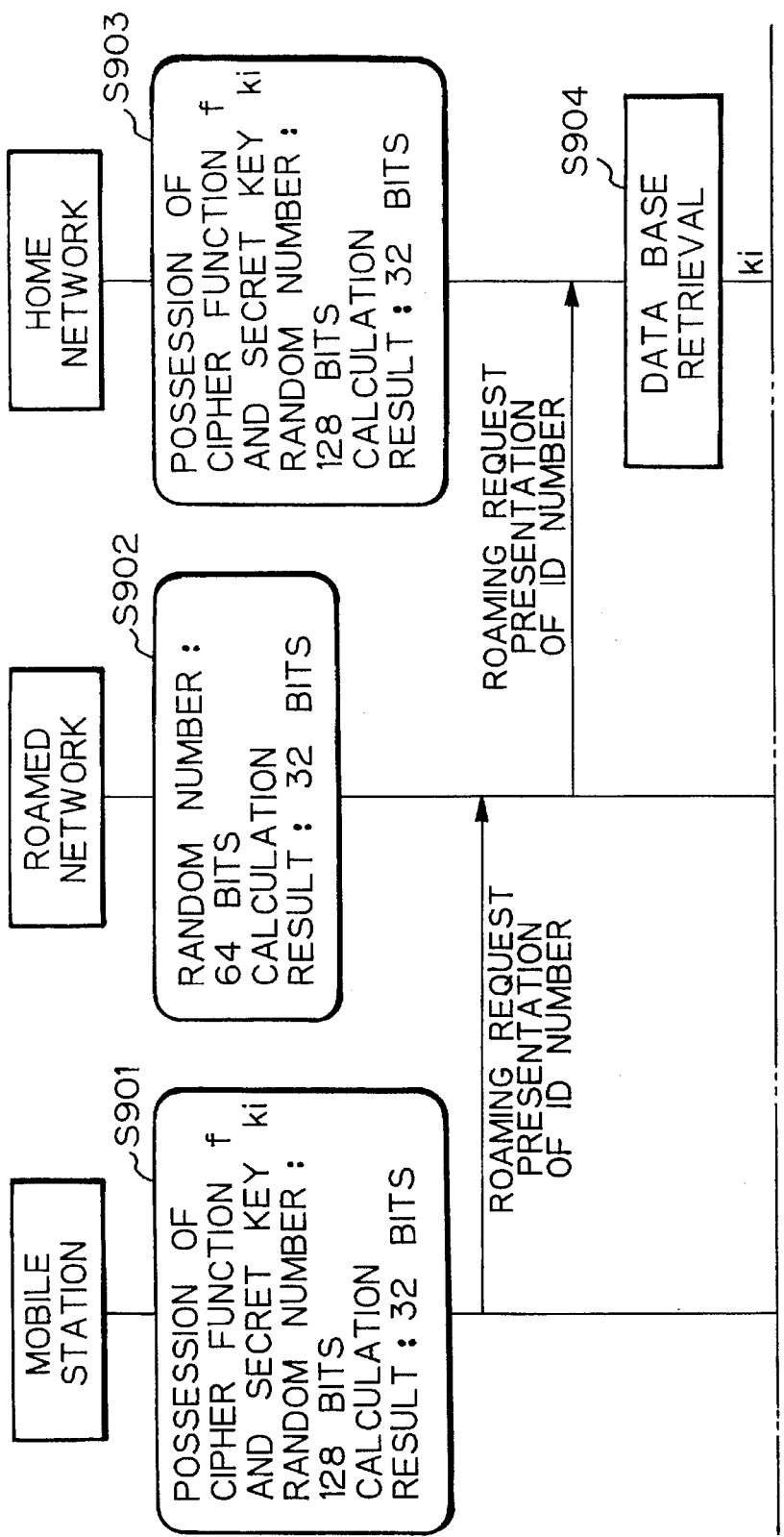

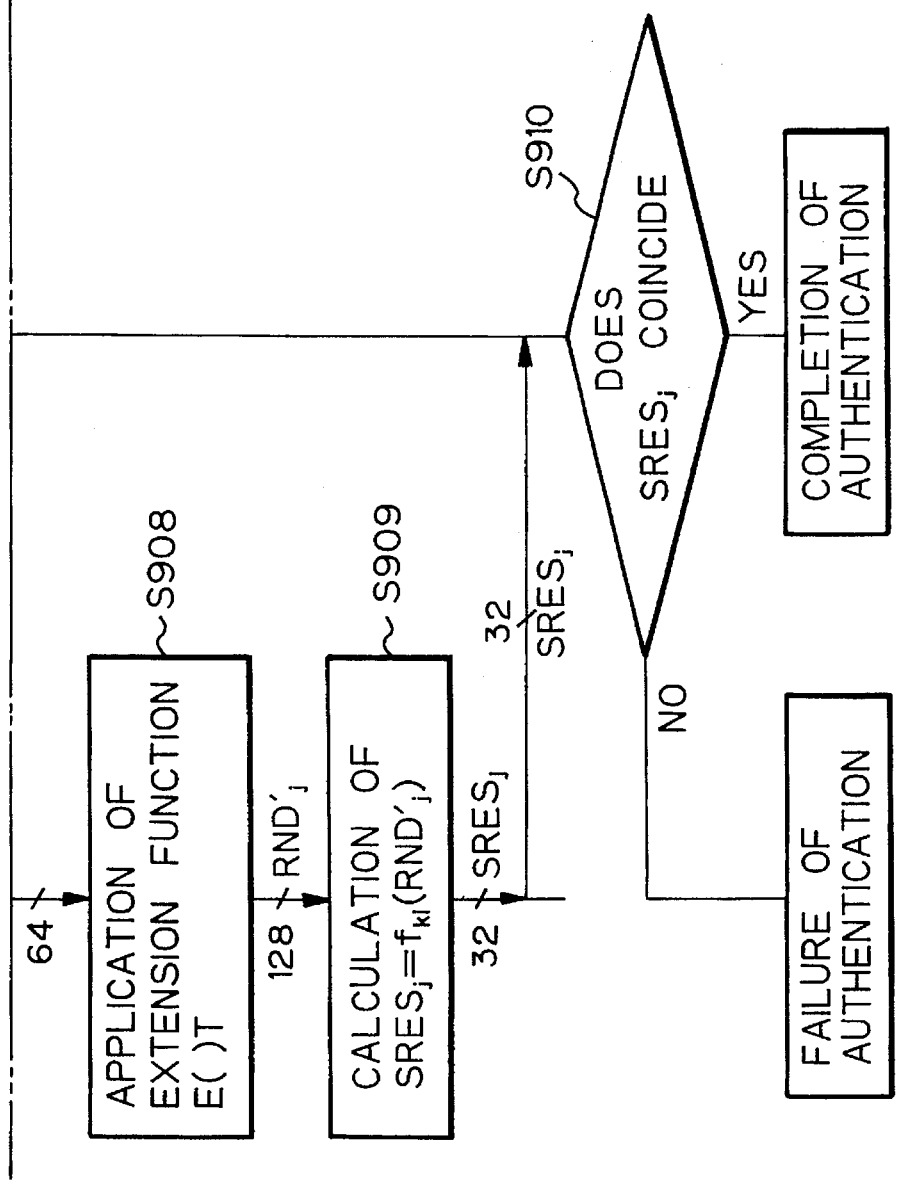

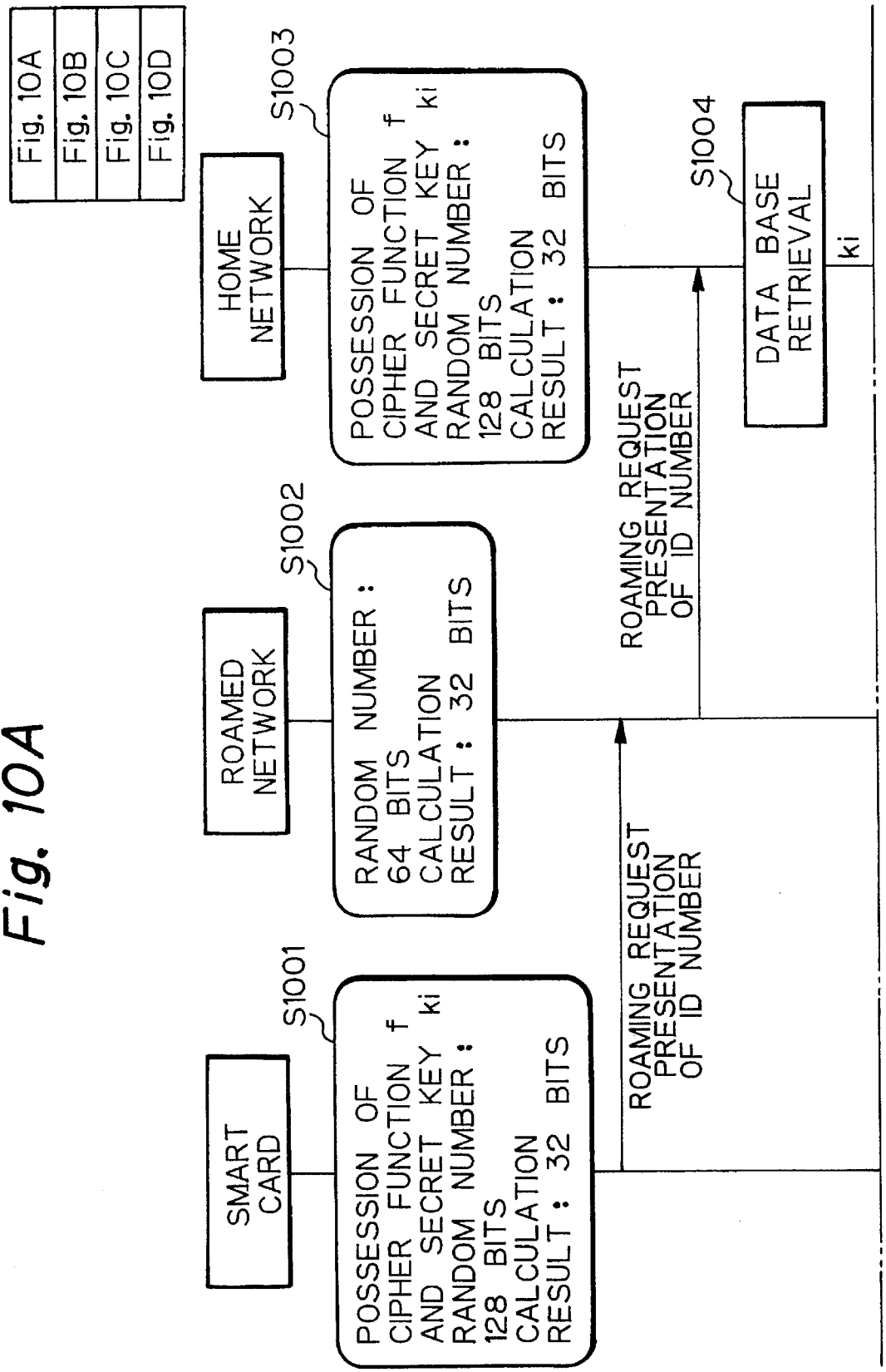

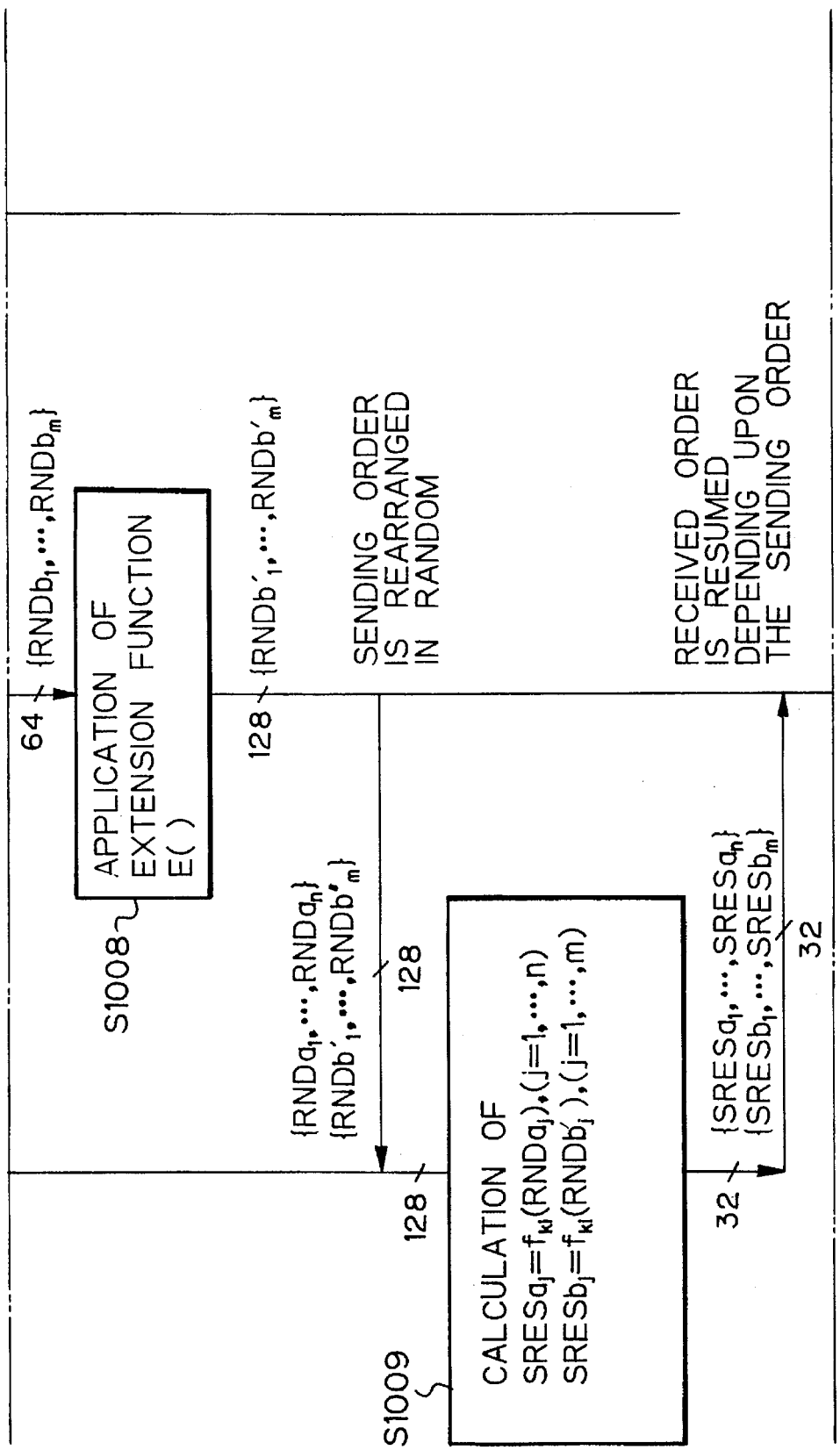

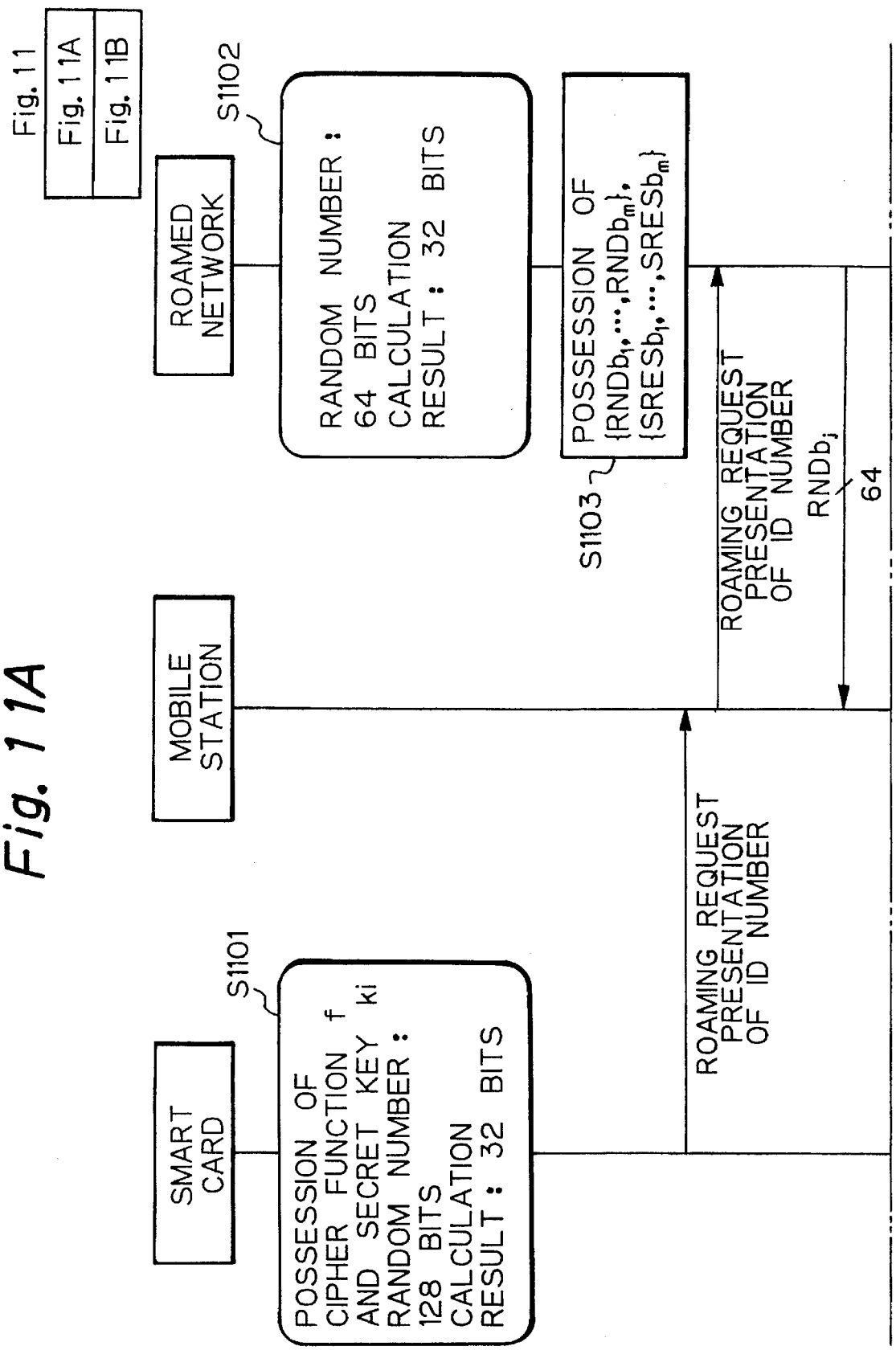

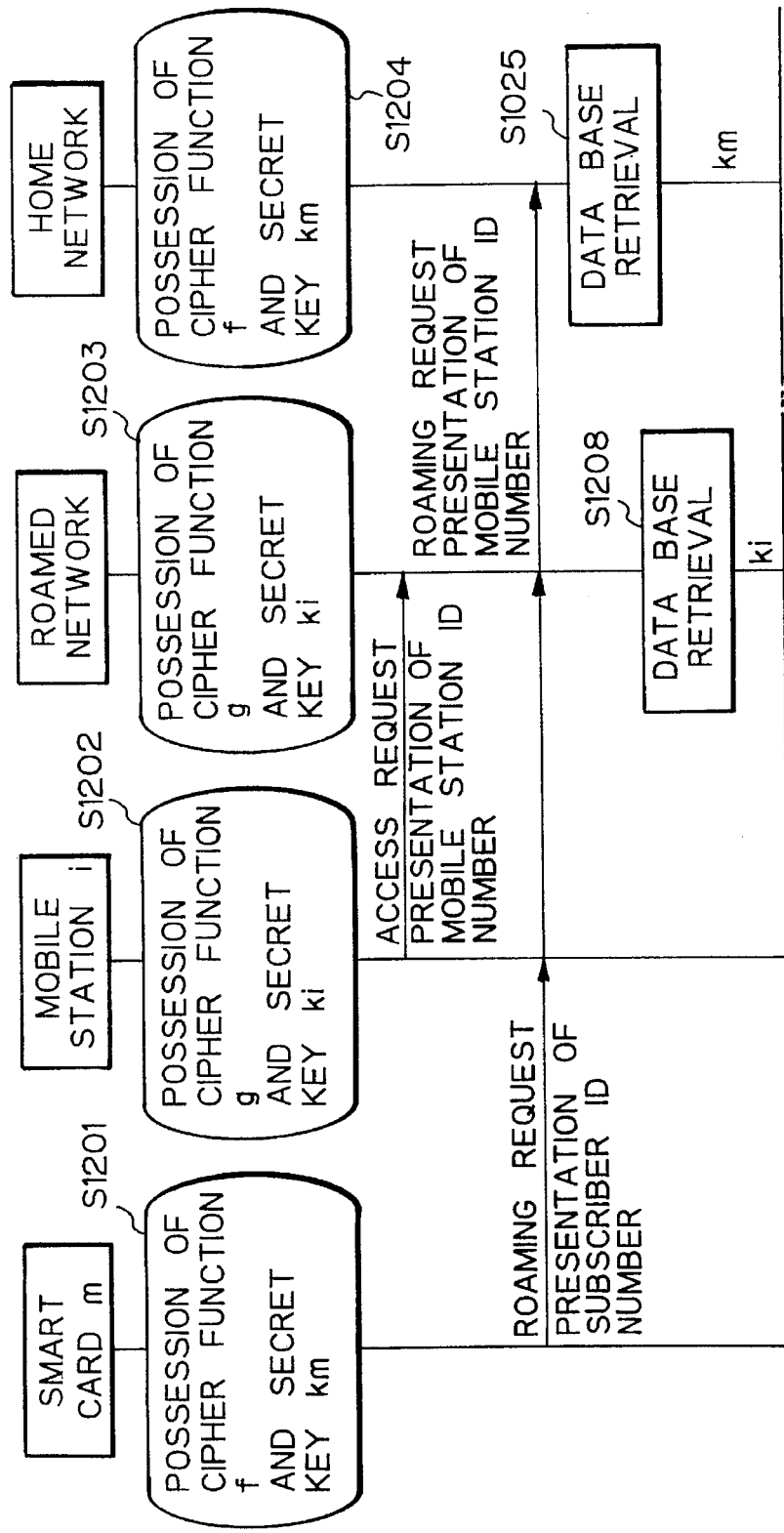

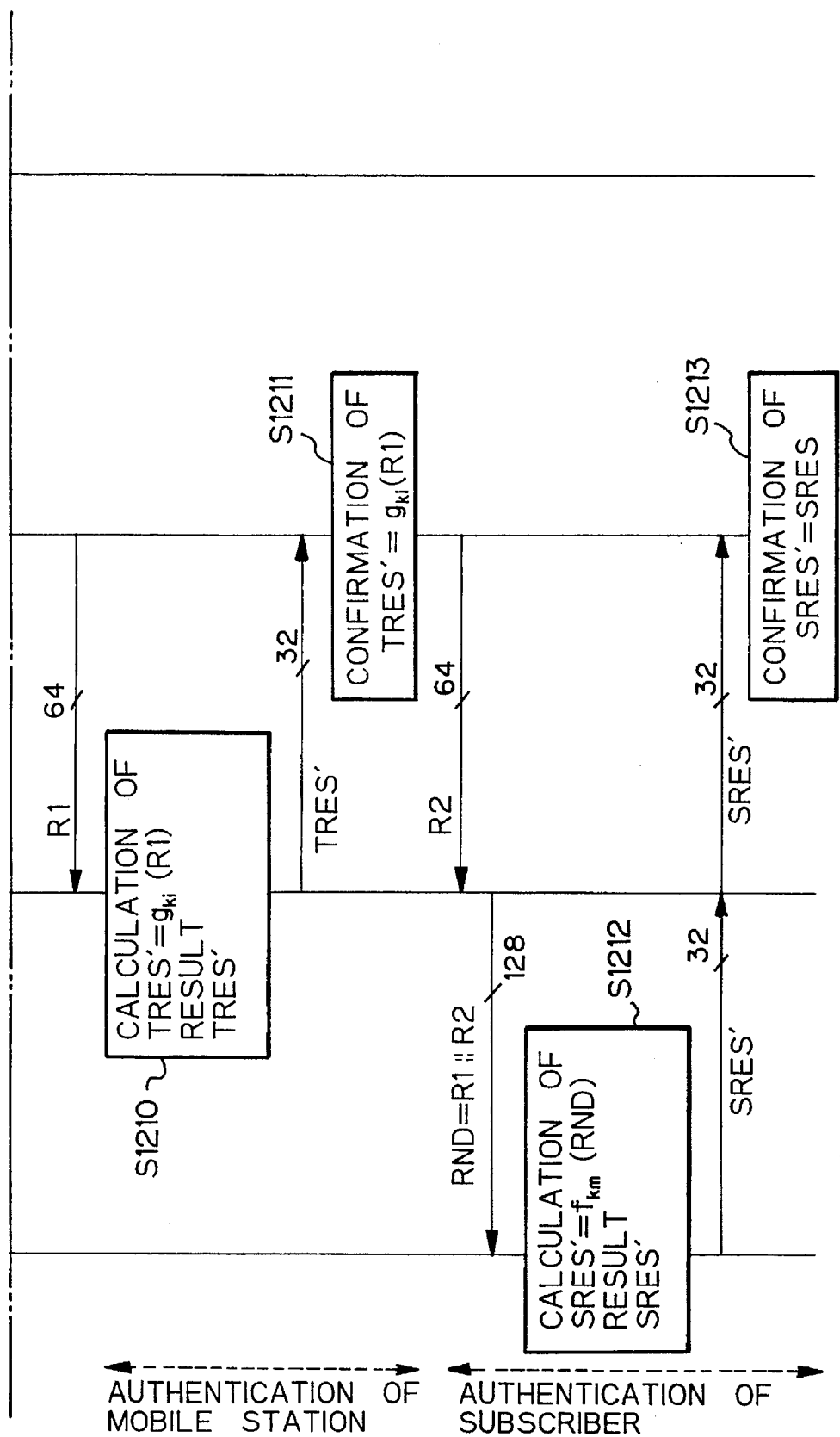

AUTHENTICATION METHOD FOR MOBILE COMMUNICATIONS

FIELD OF THE INVENTION

The present invention relates to an authentication method for mobile communications. Particularly, the invention relates to an authentication method which can be used in mobile communication networks with different algorithms, for identifying that a mobile subscriber accessing or roaming in a network different from his home network is a right subscriber in the home network.

DESCRIPTION OF THE RELATED ART

In the mobile communications, since the mobile subscribers are connected to a mobile communication network via radio interfaces, the mobile communication network has difficulty to confirm that the connected mobile subscriber is certainly a desired one. Therefore, it is required for the mobile communication network to authenticate the connected mobile subscriber.

As in such the radio environment, communication can be easily listened by any one, enough protection will be necessary for the authentication so that only the right subscribers are correctly authenticated.

Thus, in the recent digital mobile communications, a challenge-response (CR) authentication method based upon a secret key cryptography has been widely used.

Referring to FIG. 1 which shows a principle of the CR authentication, this CR authentication method will be described. According to the CR authentication method, a mobile communication network and a mobile station belonging to the network have the same secret key cipher function f. The function f has two variables, one a secret key ki and the other a random number RND. As the secret key ki may be handled as a parameter, this cipher function will be represented by $f_{ki}(RND)$ and its result will be represented by SRES.

The mobile network has secret keys {ki} of all the right mobile stations (subscribers) belonging to this network (S101). The right mobile stations have also the respective secret keys {ki} which are different from each other (S102). These secret keys {ki} are physically protected from illegal reading out. At starting the CR authentication, although not shown, the mobile station informs his identified number to the mobile network. The network then finds a secret key ki corresponding to this connected mobile station by retrieving its data base, and then generates at least one random number RND (S103). The generated RND (challenge) is sent to the mobile station. The mobile station calculates $f_{ki}(RND)$ using the received RND and his secret key ki (S104), and then sends back the result of the calculation SRES (response) to the network. Since the mobile network also has the same secret key ki and the cipher function f, the same calculation of $f_{ki}(RND)$ can be performed using the sent RND. The result of this latter calculation is compared with the result SRES from the mobile station (S105). If the result of $f_{ki}(RND)$ is equal to SRES, the authentication succeeds. Otherwise, it fails.

As is described, according to the CR authentication method, the secret key ki of the mobile station is not appeared on the radio interface. Only RND and SRES are transmitted between the mobile station and the network via this radio interface. Thus, the secret key ki will be securely protected from listening.

Furthermore, since RND can be randomly selected by the network and the correct SRES changes depending upon the selected RND, any illegal mobile station is quite difficult to be authenticated as a right mobile station even if he sends SRES previously obtained by listening to the network. Therefore, the CR authentication method is an extremely excellent method for ensuring the security of mobile communication system. Authentication methods describing this specification will utilize such the CR authentication method with modification.

It is called "roaming" that a mobile station is in communication by accessing a visited network which is different from his home network. This visited network accessed by the mobile station is called as a "roamed network". Before communication with the accessing mobile station, the roamed network is necessary for authenticating that this roaming mobile station is a right mobile subscriber registered in his home network.

However, since the roamed network neither has a secret key of the roaming mobile station nor always uses the same cipher function as his home network, a particular process will be required for authenticating the roaming mobile station from that of the mobile station in his home network as follows.

(1) In case the roamed network uses the same cipher function f as the home network, there are two methods of;

(a) sending a secret key ki of the accessing mobile station from the home network to the roamed network, and (b) producing at least one pair of challenge-response {RND, SRES} which will be necessary for authentication at the home network using a secret key ki of the accessing mobile station, and sending the produced pair {RND, SRES} to the roamed network.

FIG. 2a shows the method of (a) wherein the home network sends the secret key ki of the roaming mobile station to the roamed network. In this method, the mobile station and the home network have the same cipher function f and the same secret parameter ki (S201, S203), and the roamed network has the same cipher function (S202). If the mobile station requests roaming to the visited network with his identification number, this roamed network informs this identification number to his home network. The home network then finds a secret key ki corresponding to the roaming mobile station by retrieving its data base (S204). The found secret key ki is sent to the roamed network (S205). Thereafter, the usual CR authentication processes already described are performed between the mobile station and the roamed network using this sent secret key ki.

This method (a) is simple. However, since the secret key ki which is important for security is transmitted to the roamed network, high level protection cannot be expected.

FIG. 2b shows the method of (b) wherein the home network produces a set of CR pairs which will be necessary for authentication, by using the secret key ki of the roaming mobile station, and sends them to the roamed network. In this case, only the mobile station and the home network have the same cipher function f and the same secret parameter ki (S211, S212). If the mobile station requests roaming to the visited network with his identification number, this roamed network informs this identification number to his home network. The home network then finds a secret key ki corresponding to the roaming mobile station by retrieving its data base (S213), and generates at least one set of random numbers $\{RND_1, \ldots, RND_n\}$ (S214). The home network then calculates $f_{ki}(RND_j)$ using the generated $RND_j$ (j=1, . . . , n) and the found secret key ki (S215), and sends back a set of CR pairs, namely the generated random numbers {$RND_1, \ldots, RND_n$} and the results of the calculation {$SRES_1, \ldots, SRES_n$}, to the roamed network (S216). Thereafter, the usual CR authentication processes already described are performed between the mobile station and the roamed network.

According to this method of (b), since a set of CR pairs must be transmitted to the roamed network, the amount of transmission will be increased. However, the secret key ki which is important for security is not appeared on the link between the networks causing high level protection to be expected.

Generally, the roamed network requests and receives a plurality of CR pairs from the home network at the first roaming of the mobile station, then at every authentication of that mobile station, one pair the received CR pairs stored in the roamed network will be used without requesting a new CR pair to the home network. After all the stored CR pairs corresponding to that mobile station are used for authentication, the roamed network will request and receive new set of CR pairs from the home network.

(2) In case the roamed network does not have the same cipher function f as the home network.

In this case, the aforementioned method (a) cannot be applied, and thus the method (b) has to be used. European standard digital mobile communication system, namely GSM (Global System for Mobile communication) adopts this method (b).

The method (b) wherein at least one CR pair is transmitted from the home network to the roamed network does not require that the networks have the same cipher function f. However, according to this method, the roamed network cannot use original random numbers for authentication. Also, according to this method, respective bit lengths of the random number and of calculation result for authentication in both the roamed network and the home network are required to be equal with each other.

In general, networks with different cipher functions will use, for authentication, the random number and calculation result of different bit length. Thus, in a certain case wherein transmission of variable bit-length of the random number and of the calculation result is not supported by authentication protocol, enough information may not be transmitted through radio interfaces even if the above-mentioned method (b) is used. In such the case, good CR authentication cannot be expected.

There are four cases of transmissions of the random number and of calculation result with different bit length, as follows.

(A) Bit length of the random number in the roamed network is longer than that in the home network.

In this case, since the roamed network can completely transmit via radio interface the random number from the home network to the roaming mobile station, no problem will occur.

(B) Bit length of the random number in the roamed network is shorter than that in the home network.

In this case, the roamed network cannot transmit all the bits of the random number from the home network to the roaming mobile station. Thus, the mobile station will receive incomplete random number resulting incorrect calculation of the cipher function. Therefore, correct authentication at roaming cannot be expected in this case.

(C) Bit length of the calculation result in the roamed network is longer than that in the home network.

In this case, since the roamed network can completely transmit via radio interface the calculation result from the home network to the roaming mobile station, no problem will occur.

(D) Bit length of the calculation result in the roamed network is shorter than that in the home network.

In this case, the roamed network cannot transmit all the bits of the calculation result from the home network to the roaming mobile station. However, since the roamed network can obtain at least part of the calculation result from the mobile station in addition to the calculation result from the home network, although protection will be lowered a little, authentication can be substantially performed.

As aforementioned, according to the conventional authentication method, it is difficult to perform roaming in the case of (B). Since roaming will be requested between the networks in reciprocal, the above-mentioned trouble of (B) will certainly occur at the roaming of the networks using different bit-length random number.

SUMMARY OF THE INVENTION

It is therefore an object of the present invention to provide a mobile communication authentication method, whereby transmission amount of information can be reduced while maintaining security of the communications.

Another object of the present invention is to provide a mobile communication authentication method, whereby roaming can be performed between networks having different bit length of random number used for the authentication from each other.

According to the present invention, a method for authenticating a mobile station which accesses for roaming a network different from a home network of the mobile station is provided. In this method, the mobile station and the home network have the same secret key and use the same cipher function. The method includes two stages, namely a batch preliminary authentication stage and a main authentication stage. In the preliminary authentication stage, the mobile station is preliminarily authenticated by sending from the home network to the roamed network, a plurality of pairs of first random numbers and calculation results of the cipher function, which calculation is performed at the home network using the secret key and the first random numbers, by sending, from the roamed network to the mobile station, third random numbers formed by coupling second random numbers produced at the roamed network with the first random numbers, by sending, from the mobile station to the roamed network, calculation results of the cipher function, which calculation is performed at the mobile station using the secret key and the sent third random numbers, and by confirming, at the roamed network, coincidence of the calculation results sent from the mobile station with the calculation results sent from the home network. In the main authentication, the mobile station is authenticated by using a pair of the second random number and of the calculation result with respect to the second random number, sent from the mobile station.

It is preferred that the number of the first random numbers is smaller than that of the second random numbers.

It is also preferred that the third random numbers are sent from the roamed network in accordance with a sending order which has been rearranged in random.

The batch preliminary authentication stage will be performed by using a safety communication line between the mobile station and the roamed network. Then, in the main authentication stage, CR pairs consisting of the second random numbers and the calculation results of the cipher function based upon the second random number, which are obtained during the preliminary authentication stage and stored in the roamed network are used for authentication. Also, the roamed network obtains the calculation results of the CR pairs from the mobile station to be authenticated, in response to the second random numbers produced by the roamed network itself. It should be noted that during the preliminary authentication, the mobile station will behave as he is processing his normal authentication protocol. Furthermore, the second random numbers are combined with the first random number, and then sent to the mobile station with rearranging its sending order in random.

Therefore, according to the present invention, a mobile communication authentication method, whereby transmission amount of information can be reduced while maintaining security of the communications can be provided.

According to the present invention, an another method for authenticating a mobile station which accesses for roaming a network different from a home network of the mobile station is provided. In the method, the mobile station and the home network have the same secret key and use the same cipher function, and bit length of random numbers used in the roamed network is shorter than that used in the home network. The mobile station is authenticated by sending from the home network to the roamed network, calculation results of the cipher function, which calculation is performed at the home network using the secret key and random numbers extended by means of an extension function to the bit length of the random numbers used in the home network, by sending, from the roamed network to the mobile station, random numbers before extension, by sending, from the mobile station to the roamed network, calculation results of the cipher function, which calculation is performed at the mobile station using the secret key and random numbers extended by means of an extension function to the bit length of the random numbers used in the home network, and by confirming, at the roamed network, coincidence of the calculation result sent from the mobile station with the calculation result sent from the home network.

The mobile station and the roamed network may have the extension functions, and the roamed network may produce random numbers and extend using the extension function bit length of the random numbers.

The mobile station and the home network may have the extension functions, and the home network may produce random numbers and extend bit length of the random numbers using the extension function.

The extension function may be a block cipher system of CBC mode.

In the case that bit length of random numbers used in the roamed network is shorter than that used in the home network, the roamed network sends a random number having the shorter bit length to the mobile station. The mobile station will extend the received random number by using an extension function provided therein to obtain a random number having the same bit length as that used in the home network. The mobile station then calculates the same cipher function using the same secret key as these provided in the home network in accordance with the extended random number, and sends the calculation result to the roamed network in order to compare it with the calculation result from the home network.

Therefore, according to the present invention, a mobile communication authentication method whereby roaming can be performed between networks having different bit length of random number used for the authentication from each other can be provided.

According to the present invention, a further method for authenticating a mobile station which accesses for roaming a network different from a home network of the mobile station is provided. In this method, the mobile station and the home network have the same secret key and use the same cipher function, and bit length of random numbers used in the roamed network is shorter than that used in the home network. The method includes two stages, namely a batch preliminary authentication stage and a main authentication stage. In the preliminary authentication stage, the mobile station is authenticated by sending from the home network to the roamed network, a plurality of pairs of first random numbers and calculation results of the cipher function, which calculation is performed at the home network using the secret key and the first random numbers, by sending, from the roamed network to the mobile station, third random numbers formed by coupling second random numbers produced and extended at the roamed network by means of an extension function to the bit length of the random numbers used in the home network with the first random numbers, by sending, from the mobile station to the roamed network, calculation results of the cipher function, which calculation is performed at the mobile station using the secret key and the sent third random numbers, and by confirming, at the roamed network, coincidence of the calculation results sent from the mobile station with the calculation results sent from the home network. The main authentication stage authenticates the mobile station by using a pair of the second random number and of the calculation result with respect to the second random number, sent from the mobile station.

It is preferred that the number of the first random numbers is smaller than that of the second random numbers.

It is also preferred that the third random numbers are sent from the roamed network in accordance with a sending order which has been rearranged in random.

According to the present invention, a still further method for authenticating a smart card connected to a mobile station, which accesses for roaming a network different from a home network of the smart card is provided. In the method, the smart card and the home network have the same secret key and use the same cipher function, and bit length of random numbers used in the roamed network is shorter than that used in the home network. The method includes two stages, namely a batch preliminary authentication stage and a main authentication stage. In the preliminary authentication stage, the smart card is authenticated by sending from the home network to the roamed network, a plurality of pairs of first random numbers and calculation results of the cipher function, which calculation is performed at the home network using the secret key and the first random numbers, by sending, from the roamed network to the smart card, third random numbers formed by coupling second random numbers produced and extended at the roamed network by means of an extension function to the bit length of the random numbers used in the home network with the first random numbers, by sending, from the smart card to the roamed network, calculation results of the cipher function, which calculation is performed at the smart card using the secret key and the sent third random numbers, and by confirming, at the roamed network, coincidence of the calculation results sent from the smart card with the calculation results sent from the home network. The main authentication stage authenticates the smart card connected to the mobile station by using a pair of the second random number and of the calculation result with respect to the second random number, sent from the smart card.

It is preferred that the number of the first random numbers is smaller than that of the second random numbers.

It is also preferred that the third random numbers are sent from the roamed network in accordance with a sending order which has been rearranged in random.

According to the present invention, an another method for authenticating a smart card connected to a mobile station, which accesses for roaming a network different from a home network of the smart card is provided. In the method, the smart card and the home network have the same first secret key and use the same first cipher function, and the mobile station and the roamed network have the same second secret key and use the same second cipher function. The method includes two authentication stage, namely a mobile station authentication stage and a subscriber authentication stage. In the mobile station authentication stage, the mobile station is authenticated by sending, from the roamed network to the mobile station at least one random number, by sending, from the mobile station to the roamed network, at least one calculation result of the second cipher function, which calculation is performed at the mobile station using the second secret key and the random number sent from the roamed network, and by confirming, at the roamed network, coincidence of the calculation result sent from the mobile station with a calculation result calculated at the roamed network. The subscriber authentication stage authenticates the smart card by sending from the roamed network to the smart card at least one random number, by sending from the smart card to the roamed network, a least one calculation result of the first cipher function, which calculation is performed at the smart card using the first secret key and the random number sent from the roamed network, and by confirming, at the roamed network, coincidence of the calculation result sent from the smart card with a calculation result sent from the home network.

Preferably, the random numbers sent from the roamed network to the mobile station are produced at the roamed network by dividing a random number sent from the home network.

Further objects and advantages of the present invention will be apparent from the following description of the preferred embodiments of the invention as illustrated in the accompanying drawings.

BRIEF DESCRIPTION OF THE DRAWINGS

FIG. 3 schematically shows the constitution of a mobile communication system as a preferred embodiment according to the present invention;

FIG. 4 schematically shows the constitution of a mobile station shown in FIG. 3;

FIGS. 8a, 8b and 8c show examples of extension functions used in the embodiment of FIG. 7;

DESCRIPTION OF THE PREFERRED EMBODIMENTS

Figure 1:
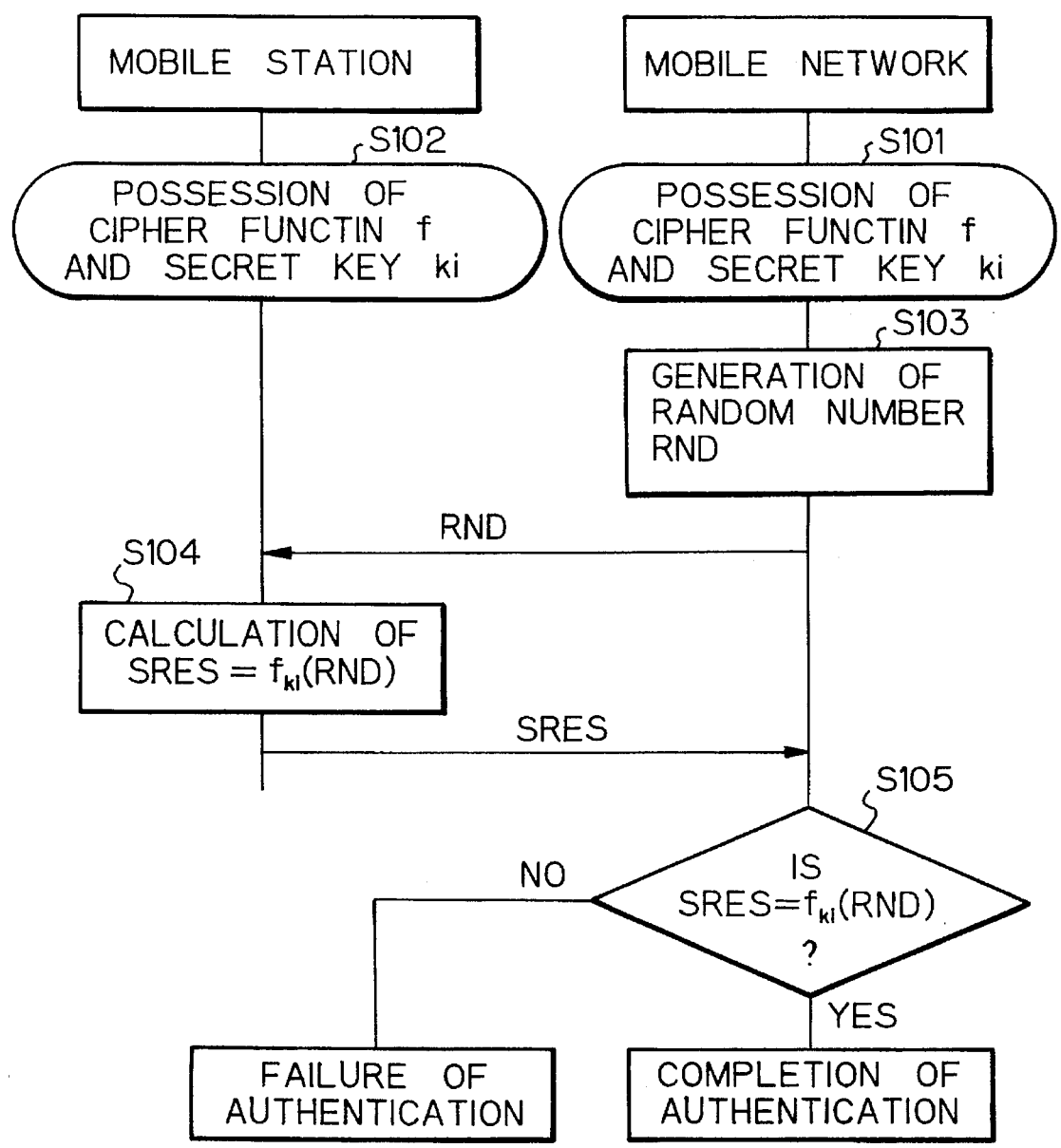
FIG. 1 is a flow chart showing the operation of a conventional CR authentication method already described.
Figure 2A:
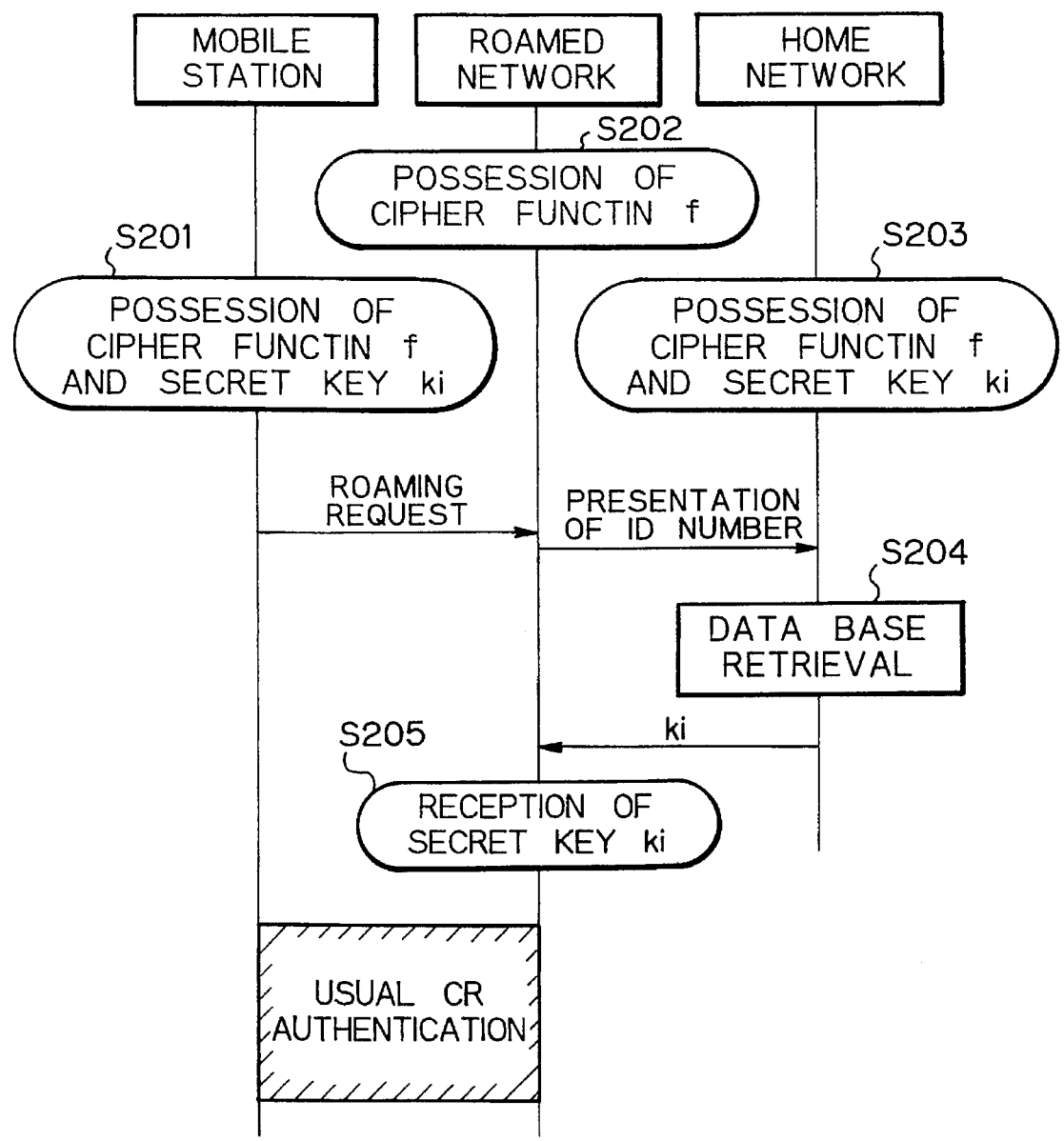
FIGS. 2a and 2b are flow charts showing the operation of an another conventional CR authentication method already described.
Figure 2B:
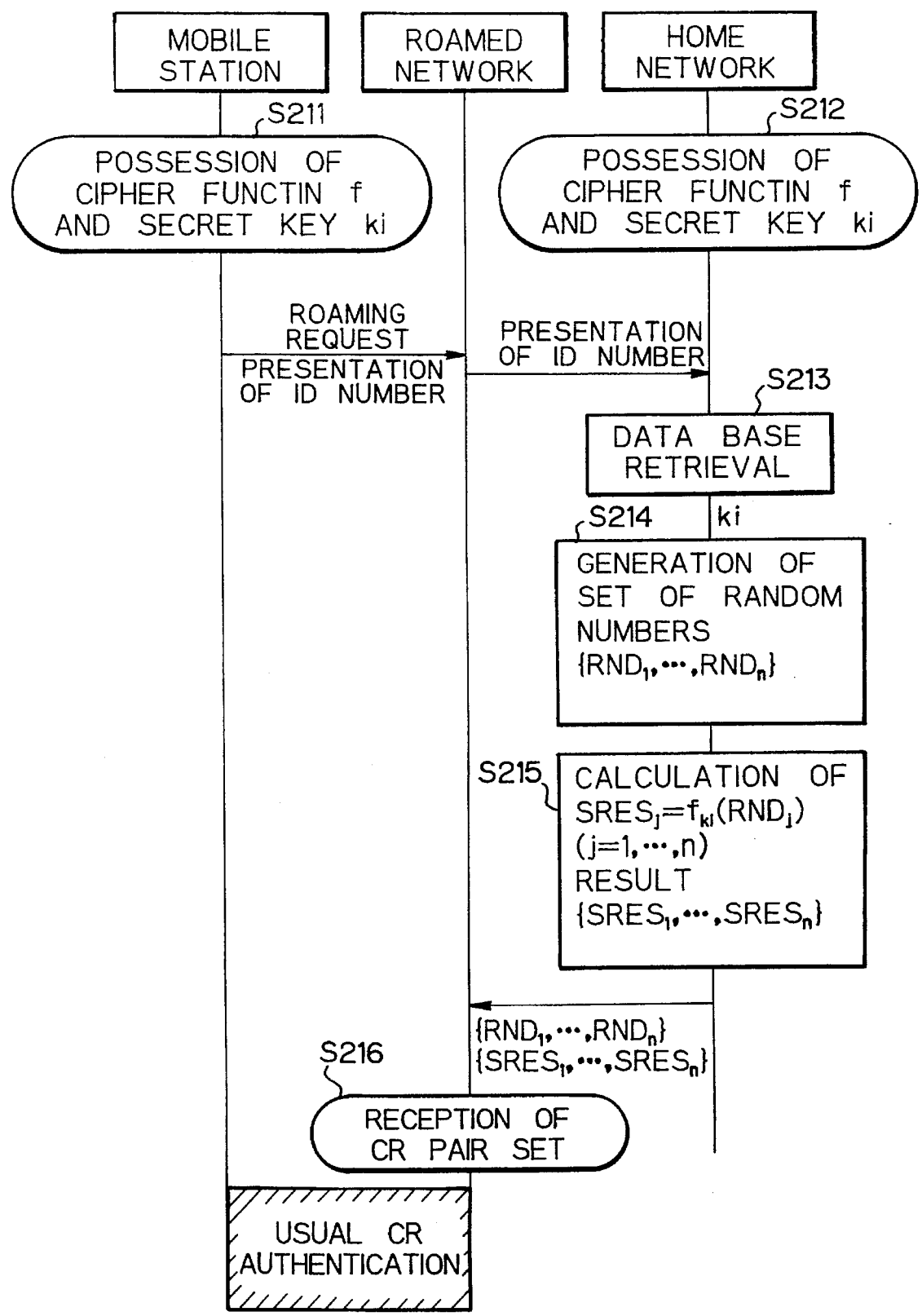

Referring to FIG. 3 which schematically shows a constitution of a mobile communication system as a preferred embodiment according to the present invention, reference numeral 30 denotes a home network and 31 shows a roamed network. In the home network 30, there are switching stations 32, a base station 33 connected to the switching station 32 by a wire line and a data base 34 connected to the switching station 32. A mobile station 35 if stayed within this network 30 as illustrated by a dotted line can be connected via a radio link to the base station 33. In the roamed network 31, there are switching stations 36, a base station 37 connected to the switching station 36 by a wire line and a data base 38 connected to the switching station 36. The mobile station 35 roaming to this network 31 is now connected via a radio link to the base station 37.

FIG. 4 schematically shows a constitution example of the mobile station 35 shown in FIG. 3. An antenna 40 is connected in series to an RF unit 41, a base-band processing unit 42 and a voice encoding and decoding unit 43. The voice encoding and decoding unit 43 is also connected to a speaker 44 and a microphone 45. A control unit 46 for controlling the operation of the RF unit 41, base-band processing unit 42 and voice encoding and decoding unit 43 is connected to these units. To the control unit 46 an I/O interface 47 for receiving a smart card 48 is also connected.

Figure 5C:
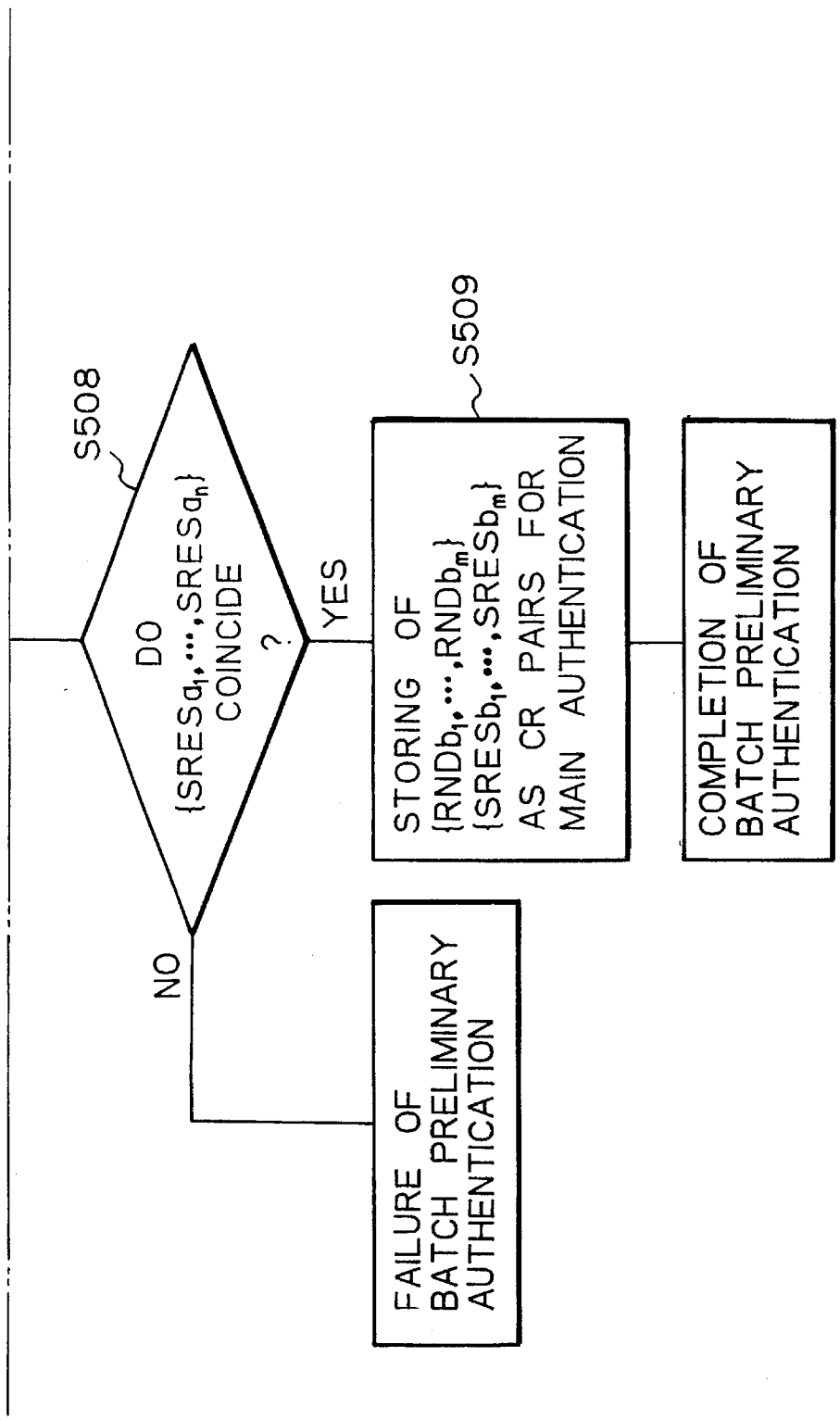
FIG. 5 which is illustrated in a separated form of FIGS. 5A, 5B and 5C is a flow chart showing the operation of a batch preliminary authentication stage according to the embodiment of FIG. 3.

FIG. 5 shows the operation of a batch preliminary authentication stage according to this embodiment.

In this stage, it is supposed that the communication link between the mobile station 35 and the base station 37 of the roamed network 31 is a secured communication line protected from eavesdropping, such as a special wire communication line or a normal radio communication line using cipher message. The mobile station 35 and the home network 30 have the same cipher function f and the same secret parameter ki assigned to this mobile station (S501, S502).

If the mobile station 35 requests a preliminary authentication to the visited network 31 with his identification number, this roamed network 31 informs this with his identification number to his home network 30. The home network 30 then finds a secret key ki corresponding to the roaming mobile station 35 by retrieving its data base 34 (S503), and generates a set of random numbers $\{RNDa_1, \ldots, RNDa_n\}$ (S504). The home network 30 then calculates $f_{ki}(RNDa_j)$ using the generated $RNDa_j$ (j=1, ..., n) and the found secret key ki (S505), and sends a set of CR pairs, namely the generated random numbers $\{RNDa_1, \ldots, RNDa_n\}$ of 62 bits and the results of the calculation {SRESa$_1$, ..., SRESa$_n$} of 32 bits, to the roamed network 31.

The roamed network 31 which has been received a set of the CR pairs generates a set of random numbers {RNDb$_1$, ..., RNDb$_m$} (S506). The roamed network then couples these calculated random numbers {RNDb$_1$, ..., RNDb$_m$} with the received random numbers {RNDa$_1$, ..., RNDa$_n$}, and sends in parallel or in series (parallel in the example of FIG. 5) the coupled random numbers to the mobile station 35 by rearranging the order of the sending numbers in random. The above-mentioned n is an integer greater one and m is an integer much greater than n (m>>n). In an unlimited example, m and n may be selected as m=100 and n=10.

The mobile station 35 calculates SRESa$_j$=f$_{ki}$(RNDa$_j$) (j=1, ..., n) and SRESb$_j$=f$_{ki}$(RNDb$_j$) (J=1, ..., m) using the received (n+m) random numbers, the cipher function f and his secret key ki (S507), and then sends back to the roamed network 31 the results of the calculation {SRESa$_1$, ..., SRESa$_n$, SRESb$_1$, ..., SRESb$_m$} which are arranged in random order. The roamed network 31 resumes the order of received calculation results in accordance with the sending order thereof, and thus obtains correctly ordered {SRESa$_1$, ..., SRESa$_n$} and {SRESb$_1$, ..., SRESb$_m$}. Then, the roamed network 31 compares the result {SRESa$_1$, ..., SRESa$_n$} calculated by and received from the mobile station 35 with the result {SRESa$_1$, ..., SRESa$_n$} calculated by and received from the home network 30 whether they coincide with each other (S508). If all of them coincide with each other, the mobile station 35 is deemed as a right mobile subscriber, and thus the random numbers {RNDb$_1$, ..., RNDb$_m$} and the calculation results {SRESb$_1$, ..., SRESb$_m$} from the mobile station 35 are stored in the roamed network 31 so as to use in the main authentication as CR pairs (S509). If one or more results do not coincide with each other, it is determined that the batch preliminary authentication fails, and then the results {SRESb$_1$, ..., SRESb$_m$} are abandoned.

Since the sending order of the random number from the roamed network 31 has been rearranged, the mobile station 35 cannot know that which of {RNDa$_1$, ..., RNDa$_n$, RNDb$_1$, ..., RNDb$_m$} corresponds to the currently received random number. Therefore, if all the calculation results with respect to {RNDa$_1$, ..., RNDa$_n$} coincide as aforementioned, not only the mobile station 35 is deemed as a right one but also a set of the CR pairs {RNDb$_1$, ..., RNDb$_m$} and {SRESb$_1$, ..., SRESb$_m$} are considered as legal CR pairs.

Figure 6:
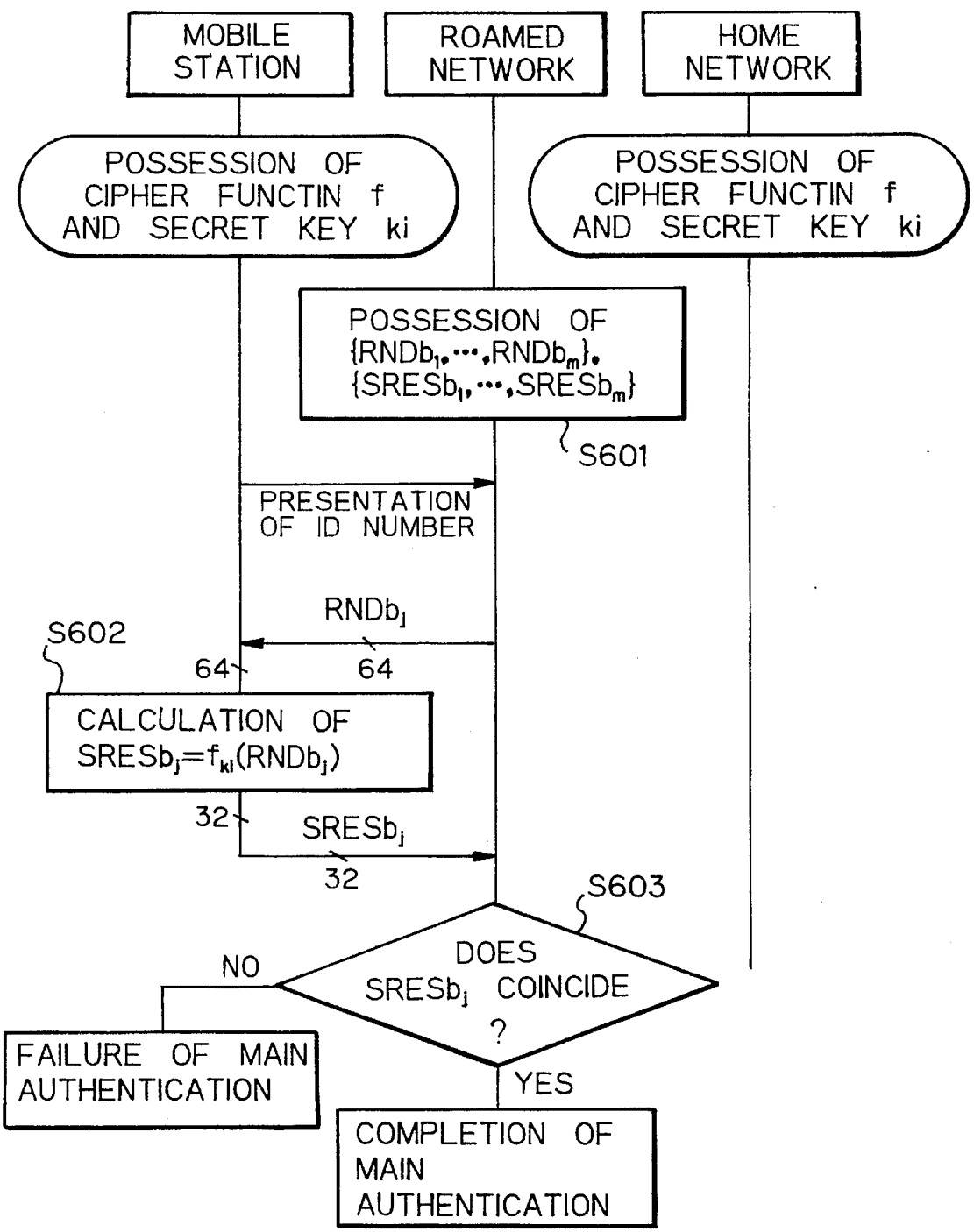
FIG. 6 is a flow chart showing the operation of a main authentication stage according to the embodiment of FIG. 3.

After succeeding the above-mentioned batch preliminary authentication of the mobile station 35. The roamed network 31 can start the main authentication shown in FIG. 6 at any time when this mobile station 35 requests roaming via the radio interface.

When the mobile station 35 requests roaming with his identification number, since the results of the preliminary authentication (CR pairs) {RNDb$_1$, ..., RNDb$_m$} and {SRESb$_1$, ..., SRESb$_m$} have already stored in the roamed network 31 (S601), the network 31 sends one of the random numbers RNDb$_j$ of 64 bits to the mobile station 35. The mobile station 35 then calculates SRESb$_j$=f$_{ki}$(RNDb$_j$) using the received RNDb$_j$, its cipher function f and its secret key ki (S602), and sends back the calculated result SRESb$_j$ of 32 bits to the roamed network 31. The result of this calculation SRESb$_j$ is compared with the corresponding result SRESb$_j$ stored in the roamed network at the preliminary authentication stage (S603). If they coincide with each other, the main authentication succeeds. Otherwise, it fails.

It should be noted that at every main authentication of this mobile station 35, one pair of the CR pairs stored in the roamed network 31 at the batch preliminary authentication will be used. At a roaming from this mobile station 35 after all the stored CR pairs of this station 35 have been used, new preliminary authentication will be required.

In the main authentication stage, the random numbers {RNDb$_1$, ..., RNDb$_m$} which once sent to the mobile station are used again. Thus, if these numbers were eavesdropped during the preliminary authentication stage, the eavesdropper may disguise as a right subscriber at the main authentication. Therefore, the communication line between the mobile station and the roamed network during the preliminary authentication should be a secured communication line protected from eavesdropping.

In order to simplify, it has been described that the mobile station itself has the cipher function and the secret key. However, in the many mobile communication systems, smart cards which store these cipher functions and assigned secret keys may be provided. In such the cases, during the preliminary authentication, only the smart cards may be connected to the roamed network by inserting them into dedicated wire line terminals in the roamed network instead of connecting via the radio interfaces so that the communication line between the mobile station and the roamed network is secured from eavesdropping.

As will be apparent from the above-description, according to this embodiment, the roamed network can obtain a desired number of CR pairs from the random numbers generated by itself and the calculation results calculated by the mobile station in accordance with the above random numbers without receiving a large number of the CR pairs from the home network. Since the number n of the random numbers sent from the home network and used for the preliminary authentication is much less than the number m of the random numbers generated in the roamed network (m>>n), the amount of information transmitted between the networks can be extremely reduced. Furthermore, this method will be effective in case the roamed network is impossible for calculating the cipher function f.

Figure 7B:
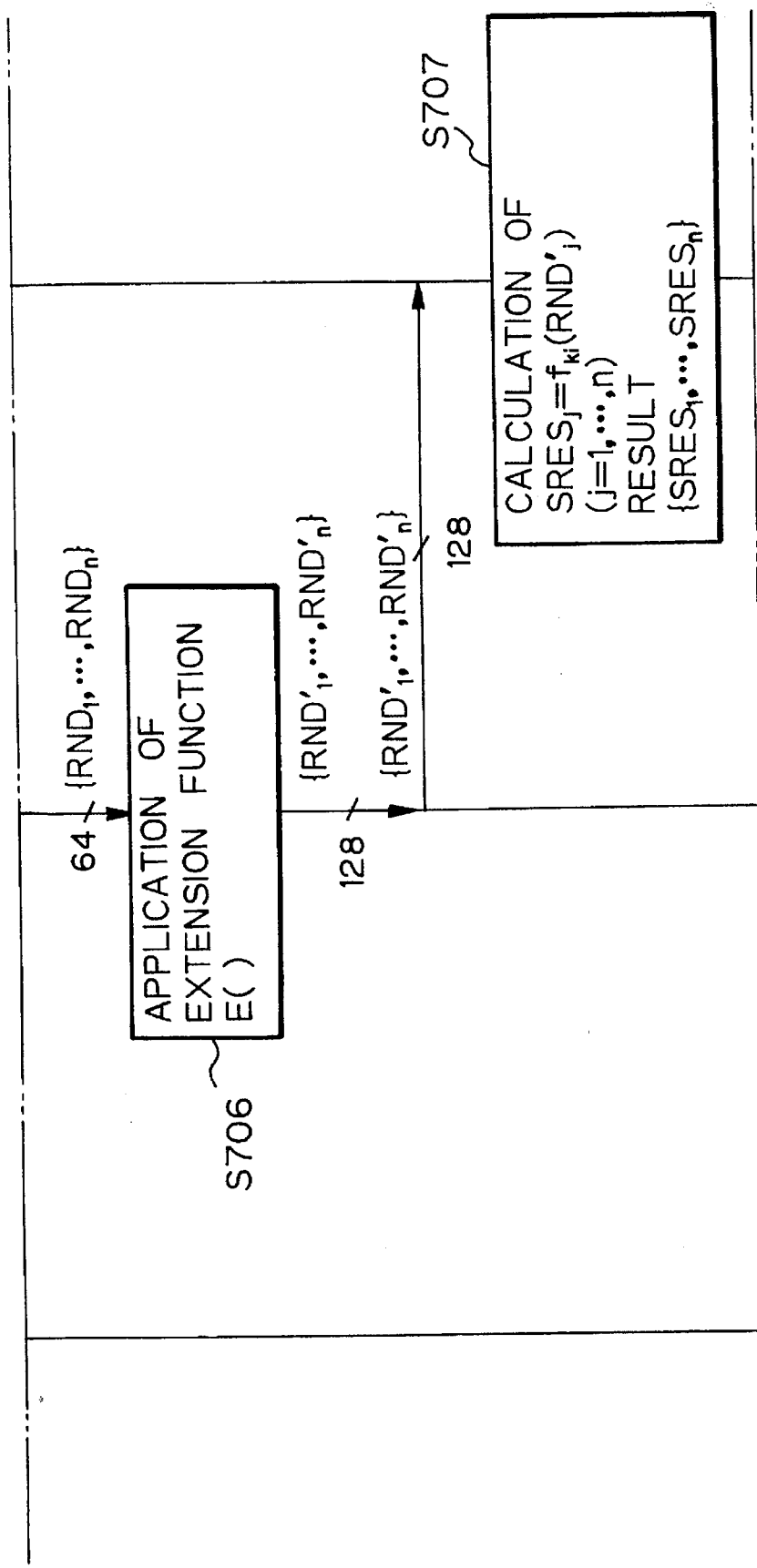
FIG. 7 which is illustrated in a separated form of FIGS. 7A, 7B and 7C is a flow chart showing the operation of an another embodiment according to the present invention.

FIG. 7 shows the operation of an another embodiment according to the present invention. The constitution of a mobile communication system and the constitution of a mobile station are the same as these shown in FIGS. 3 and 4.

This embodiment concerns a mobile communication system having an authentication protocol wherein the roamed network is allowed to produce random numbers. In this embodiment, the mobile station 35 and the home network 30 have the same cipher function f and the same secret parameter ki assigned to this mobile station (S701, S703). Bit length of the random numbers used in the home network 30 and in the mobile station 35 is 128 bits, and bit length of the calculation results used therein is 32 bits (S701, S703). The roamed network 31, on the other hand, has a cipher function different from f. Bit length of the random numbers used in this roamed network 31 is 64 bits and bit length of its calculation result is for example 32 bits (S702). Furthermore, the mobile station 35 and the roamed network 31 are provided with extension functions E( ) for extending the bit length from 64 bits to 128 bits.

If the mobile station 35 requests roaming to the visited network 31 with his identification number, this roamed network 31 informs this with his identification number to his home network 30. The home network 30 then finds a secret key ki corresponding to the roaming mobile station 35 by retrieving its data base 34 (S704). The roamed network 31 then generates a set of random numbers {$RND_1, \ldots, RND_n$} of 64 bits (S705), and produces extended random numbers {$RND'_1, \ldots, RND'_n$} of 128 bits by applying the extension function E( ) to the 64-bits random numbers {$RND_1, \ldots, RND_n$} (S706). The extended random numbers {$RND'_1, \ldots, RND'_n$} are sent to the home network 30. Thus, the home network 30 calculates $f_{ki}(RND'_j)$ using the received $RND'_j$ (j=1, ..., n) and the found secret key ki (S707). The results of the calculation {$SRES_1, \ldots, SRES_n$} of 32 bits are sent back to and stored in the roamed network 31 as sets of the random numbers, their extended random numbers and their calculated results {$RND_j, RND'_j, SRES_j$} (j=1, ..., n).

At the authentication of the mobile station, the roamed network 31 extracts an unused set of the random number, its extended random number and its calculated result {$RND_j$, $RND'_j$, $SRES_j$} from the stored these sets. Then, the random number $RND_j$ in this extracted set is sent to the mobile station 35 via radio interface. The mobile network 35 produces extended random numbers $RND'_j$ of 128 bits by applying the extension function E( ) to $RND_j$ (S708), and then calculates $SRES_j=f_{ki}(RND'_j)$ using the extended $RND'_j$ and his secret key ki (S709). The result of the calculation $SRES_j$ of 32 bits is sent back to the roamed network 31. Then, the roamed network 31 compares the result $SRES_j$ calculated by and received from the mobile station 35 with the result $SRES_j$ stored therein whether they coincide with each other (S710). If they coincide with each other, the authentication succeeds. Otherwise, it fails.

There are many extension functions. FIGS. 8a, 8b and 8c show simple examples of these extension functions. The most simple extension function is shown in FIG. 8a or 8b, wherein 64-bits input is inserted into upper (right) or lower (left) half bits of 128 bits output and the remaining half bits are filled with "0" or fixed numeral. However, since it will be easily revealed from the received output that an extension function is utilized to produce such the long bit output, using of these extension functions is undesirable.

For an extension function, it is necessary that;

(1) the input value of 64 bits cannot be easily assumed from the output of 128 bits, and (2) whether extended 128 bits output or original 128 bits output cannot be easily assumed from the received output.

A block cipher system of CBC mode shown in FIG. 8c may be an example of the extension function which satisfies both the above-mentioned conditions (1) and (2). In the figure, reference numeral 80 denotes an exclusive OR circuit and 81 a block cipher circuit for enciphering 64 bits input, namely for calculating a function F( ) with respect to its input of 64 bits. If the input of this system is represented by $M_1$ of 64 bits, corresponding output $C_1$ of the circuit 81 will be $C_1=F(M_1)$. As this output is fedback and applied to the exclusive OR circuit 80, the next output $C_2$ will be $C_2=F\{F(M_1) \oplus M_1\}$. An extended 128 bits output will be obtained by coupling these 64 bits outputs $C_1$ and $C_2$ as the upper half bits and lower half bits of the 128 bits output, respectively.

According to this embodiment, although random numbers transmitted between the mobile station and the roamed network via radio interface are 64-bits random numbers, the mobile station can perform the authentication using random numbers of 128 bits, which authentication is the same as that in the home network.

Figure 9B:
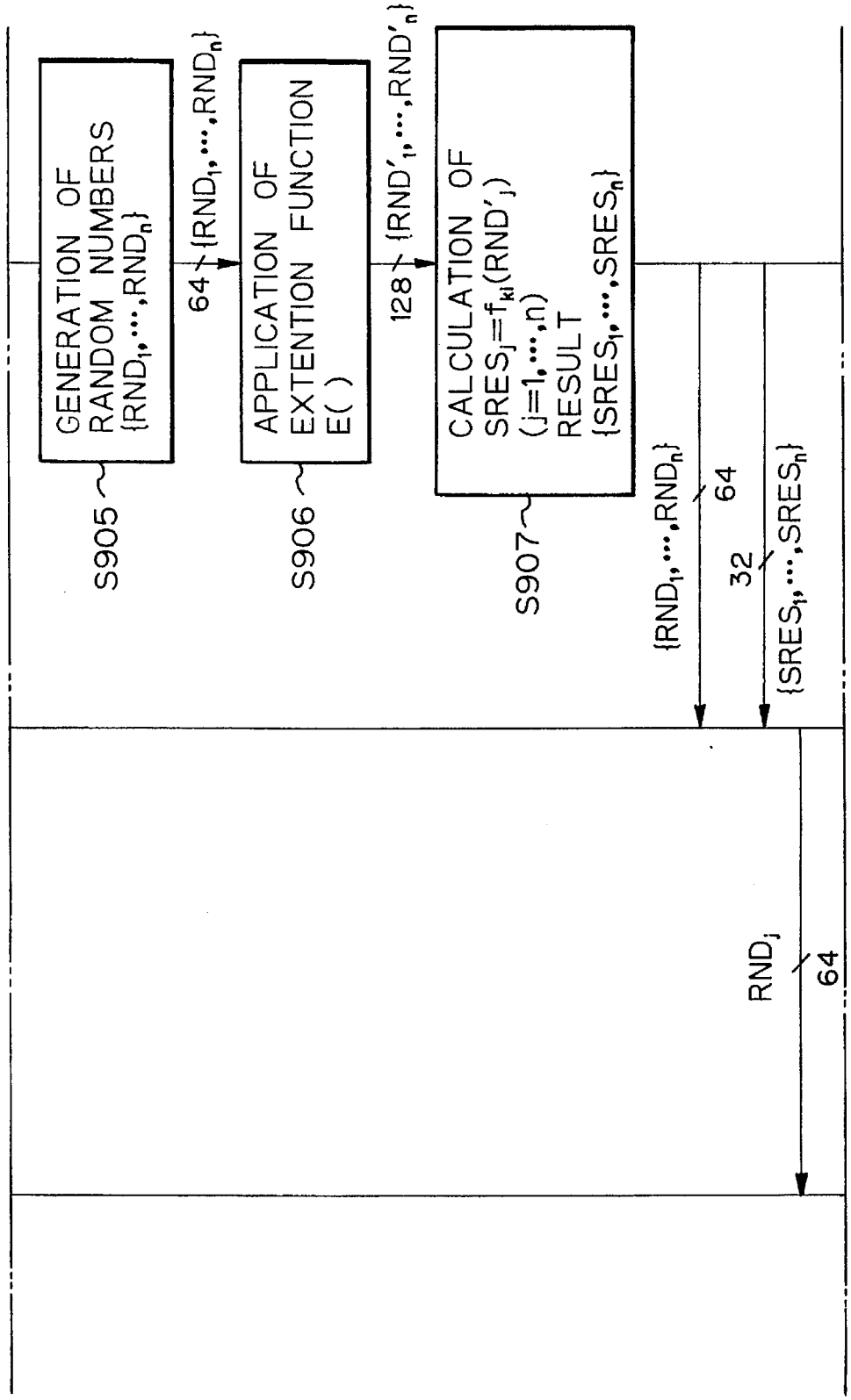
FIG. 9 which is illustrated in a separated form of FIGS. 9A, 9B and 9C is a flow chart showing the operation of a further embodiment according to the present invention.

FIG. 9 shows the operation of a further embodiment according to the present invention. The constitution of a mobile communication system and the constitution of a mobile station are also the same as these shown in FIGS. 3 and 4.

This embodiment concerns a mobile communication system having an authentication protocol wherein the home network is allowed to produce random numbers of 64 bits. In this embodiment, also, the mobile station 35 and the home network 30 have the same cipher function f and the same secret parameter ki assigned to this mobile station (S901, S903). Bit length of the random numbers used in the home network 30 and in the mobile station 35 is 128 bits, and bit length of the calculation results used therein is 32 bits (S901, S903). The roamed network 31, on the other hand, has a cipher function different from f. Bit length of the random numbers used in this roamed network 31 is 64 bits and bit length of its calculation result is for example 32 bits (S902). Furthermore, the mobile station 35 and the home network 30 are provided with extension functions E( ) for extending the bit length from 64 bits to 128 bits.

If the mobile station 35 requests roaming to the visited network 31 with his identification number, this roamed network 31 informs this with his identification number to his home network 30. The home network 30 then finds a secret key ki corresponding to the roaming mobile station 35 by retrieving its data base 34 (S904). The home network 30 then generates a set of random numbers {$RND_1, \ldots, RND_n$} of 64 bits (S905), and produces extended random numbers {$RND'_1, \ldots, RND'_n$} of 128 bits by applying the extension function E( ) to the 64-bits random numbers {$RND_1, \ldots, RND_n$} (S906). Next, the home network 30 calculates $f_{ki}(RND'_j)$ using the calculated $RND'_j$ (j =1, ..., n) and the found secret key ki (S907). The generated random numbers {$RND_1, \ldots, RND_n$} of 64 bits and the results of the calculation {$SRES_1, \ldots, SRES_n$} of 32 bits are sent to and stored in the roamed network 31 as CR pairs of {$RND_j, SRES_j$} (j=1, ..., n).

At the authentication of the mobile station, the roamed network 31 extracts an unused CR pair of the random number and its calculated result {$RND_j, SRES_j$} from the stored these CR pairs. Then, the random number RNDj of this extracted pair is sent to the mobile station 35 via radio interface. The mobile network 35 produces extended random numbers $RND'_j$ of 128 bits by applying the extension function E( ) to $RND_j$ (S908), and then calculates $SRES_j = f_{ki}(RND'_j)$ using the extended $RND'_j$ and his secret key ki (S909). The result of the calculation $SRES_j$ of 32 bits is sent back to the roamed network 31. Then, the roamed network 31 compares the result $SRES_j$ calculated by and received from the mobile station 35 with the result $SRES_j$ stored therein whether they coincide with each other (S910). If they coincide with each other, the authentication succeeds. Otherwise, it fails.

This embodiment differs from the embodiment of FIG. 7 in that the home network, not the roamed network, has an extension function used for extending the random numbers and that the random number of 64 bits are sent from the home network to the roamed network.

Figure 10B:
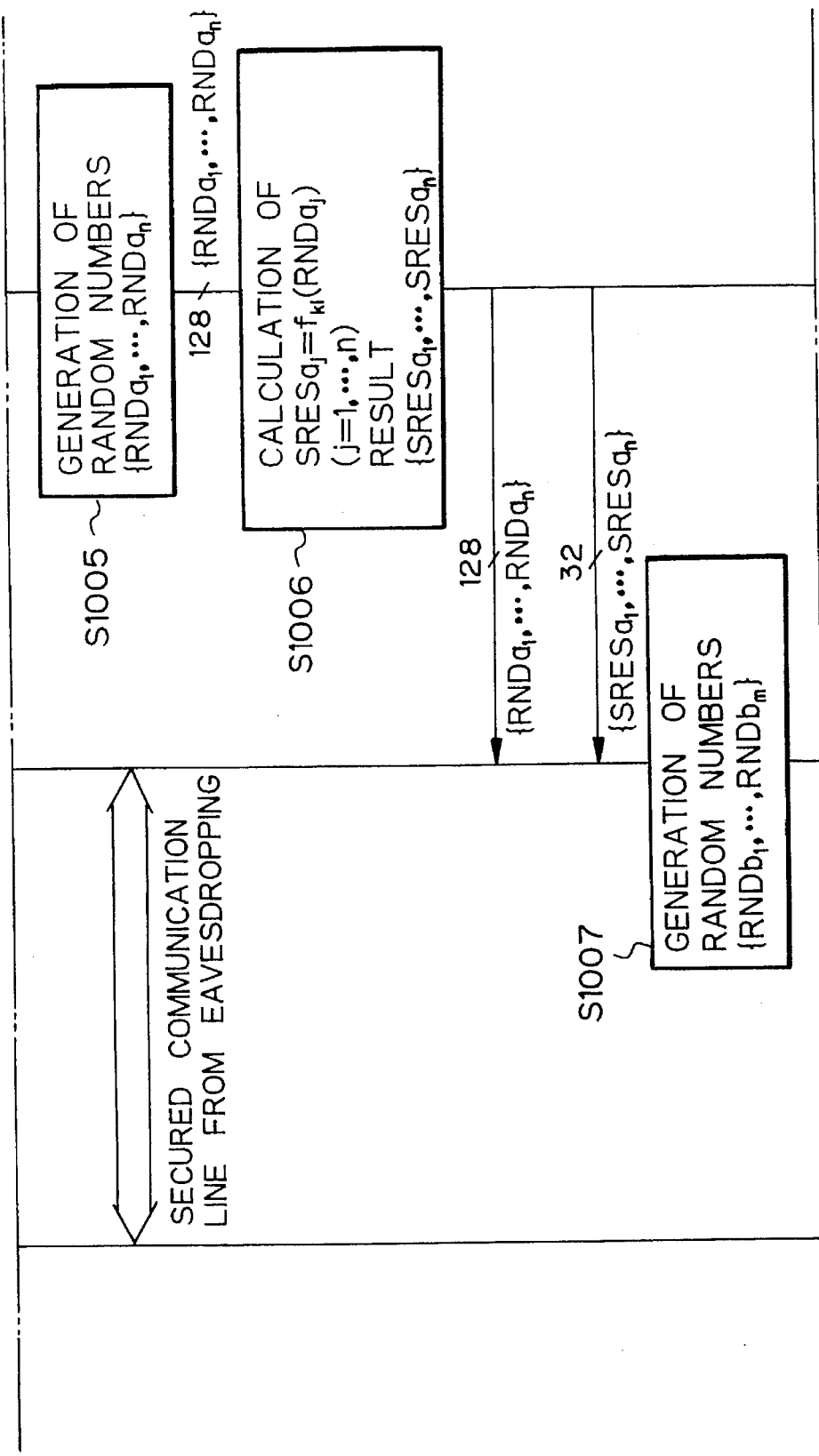
FIG. 10 which is illustrated in a separated form of FIGS. 10A, 10B, 10C and 10D is a flow chart showing the operation of a batch preliminary authentication stage of a still further embodiment according to the present invention.
Figure 10D:
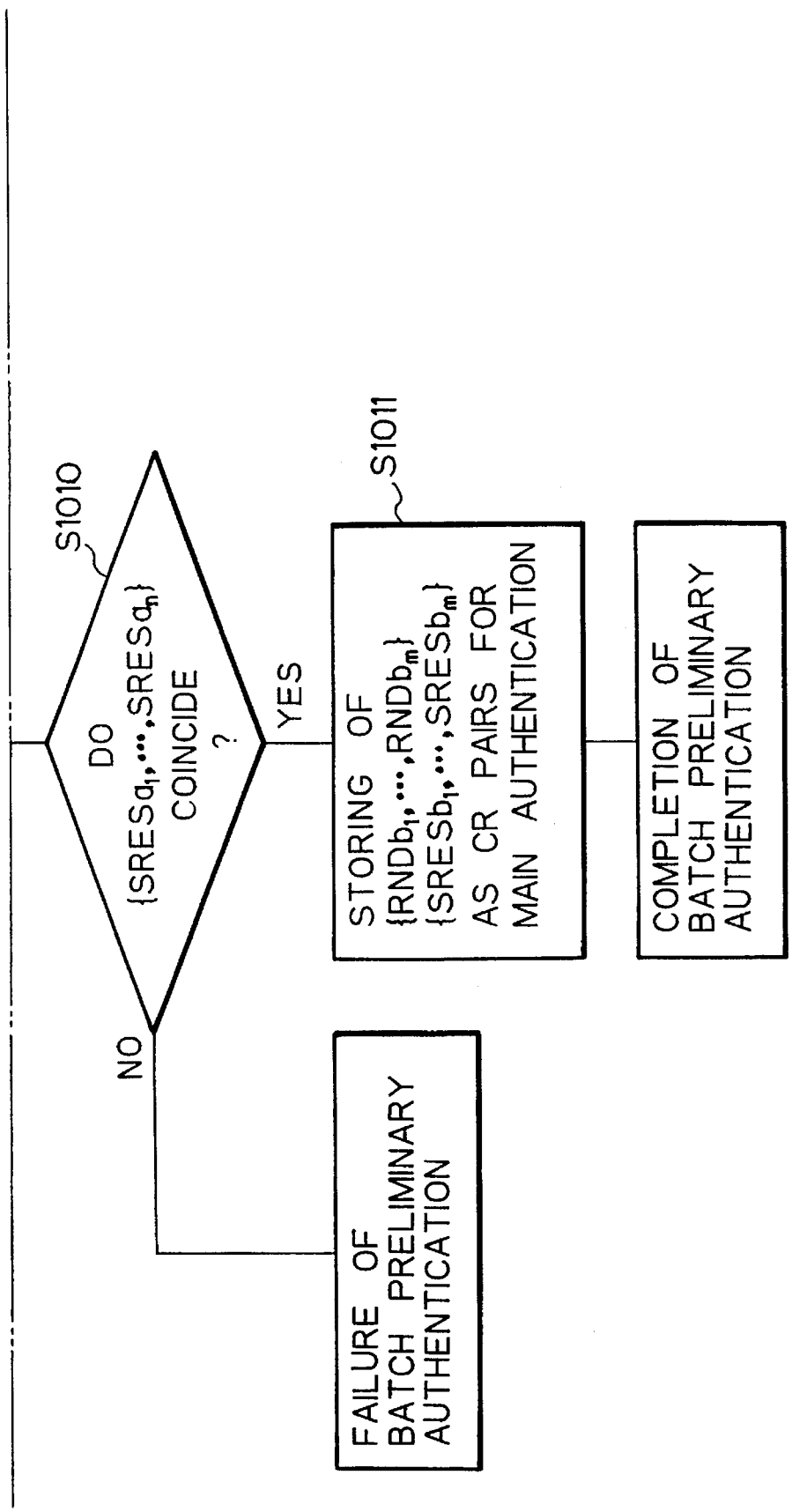
Figure 11B:
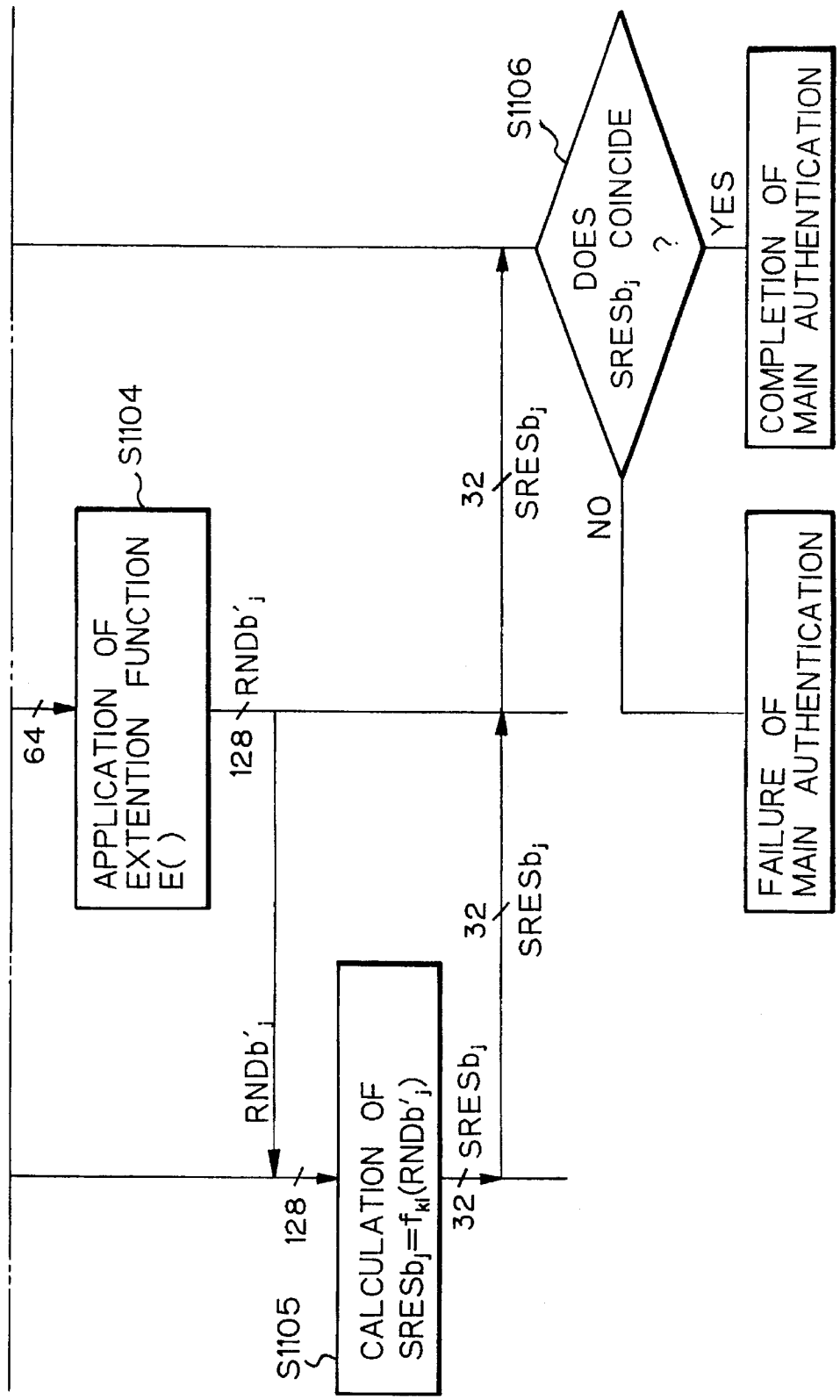
FIG. 11 which is illustrated in a separated form of FIGS. 11A and 11B is a flow chart showing the operation of a main authentication stage according to the embodiment of FIG. 10.

FIGS. 10 and 11 show the operation of a still further embodiment according to the present invention. The constitution of a mobile communication system and the constitution of a mobile station are also the same as these shown in FIGS. 3 and 4.

This embodiment concerns a mobile communication system having an authentication protocol wherein the roamed network 31 is not allowed to produce random numbers.

The authentication process in this embodiment consists of two stages of a batch preliminary authentication stage, and a main authentication stage. In this embodiment, furthermore, a smart card 48 having safety a cipher function and a secret key, and performing the preliminary authentication operation and most of the main authentication operation is provided. Thus, the mobile station 35 will take partial charge of radio communication operation other than that performed by the smart card. It is supposed that the smart card 48 according to the embodiment has its own identification number. In another embodiment, either only the mobile station may have its identification number or both the mobile station and the smart card may have their respective identification numbers.

FIG. 10 shows the operation of the batch preliminary authentication stage according to this embodiment.

In this stage, it is supposed that the communication link between the smart card 48 and the roamed network 31 is a secured communication line protected from eavesdropping, such as a special wire communication line or a normal radio communication line using cipher message. The smart card 48 and the home network 30 have the same cipher function f and the same secret parameter ki assigned to this smart card (S1001, S1003). Bit length of the random numbers used in the home network 30 and in the smart card 48 is 128 bits, and bit length of the calculation results used therein is 32 bits (S1001, S1003, S1101 of FIG. 11). The roamed network 31, on the other hand, has a cipher function different from f. Bit length of the random numbers used in this roamed network 31 is 64 bits and bit length of its calculation result is for example 32 bits (S1002, S1102 of FIG. 11). Furthermore, the mobile station 35 and the roamed network 31 are provided with extension functions E( ) for extending the bit length from 64 bits to 128 bits.

If the smart card 48 requests preliminary authentication to the roamed network 31 with its identification number, this roamed network 31 informs this with his identification number to his home network 30. The home network 30 then finds a secret key ki corresponding to this smart card by retrieving its data base 34 (S1004), and generates a set of random numbers $\{RNDa_1, \ldots, RNDa_n\}$ (S1005) of 128 bits. The home network 30 then calculates $f_{ki}(RNDa_j)$ using the generated $RNDa_j$ (j=1, ..., n) and the found secret key ki (S1006), and sends back a set of CR pairs, namely the generated random numbers $\{RNDa_1, \ldots, RNDa_n\}$ of 128 bits and the result of the calculation $\{SRESa_1, \ldots, SRESa_n\}$ of 32 bits, to the roamed network 31.

The roamed network 31 which has been received a set of CR pairs generates a set of another random numbers $\{RNDb_1, \ldots, RNDb_m\}$ of 64 bits (S1007), and produces extended random numbers $\{RNDb'_1, \ldots, RNDb'_m\}$ of 128 bits by applying the extension function E( ) to the 64-bits random numbers $\{RNDb_1, \ldots, RNDb_m\}$ (S1008). The roamed network then couples these extended random numbers $\{RNDb'_1, \ldots, RNDb'_m\}$ with the received random numbers $\{RNDa_1, \ldots, RNDa_n\}$, and sends in parallel or in series (parallel in the example of FIG. 10) these coupled random numbers of 128 bits to the smart card 48 by rearranging the order of the sending numbers in random. The above-mentioned n is an integer greater one and m is an integer much greater than n (m>>n). In an unlimited example, m and n may be selected as m=100 and n=10.

The smart card 48 calculates $SRESa_j=f_{ki}(RNDa_j)$ (j=1, ..., n) and $SRESb_j=f_{ki}(RNDb'_j)$ (j=1, ..., m) using the received (n+m) random numbers, the cipher function f and his secret key ki (S1009), and then sends back to the roamed network 31 the results of the calculation $\{SRESa_1, \ldots, SRESa_n, SRESb_1, \ldots, SRESb_m\}$ which are arranged in random order. The roamed network 31 resumes the order of received calculation results in accordance with the sending order thereof, and thus obtains correctly ordered $\{SRESa_1, \ldots, SRESa_n\}$ and $\{SRESb_1, \ldots, SRESb_m\}$. Then, the roamed network 31 compares the result $\{SRESa_1, \ldots, SRESa_n\}$ calculated by and received from the smart card 48 with the result $\{SRESa_1, \ldots, SRESa_n\}$ calculated by and received from the home network 30 whether they coincide with each other (S1010). If all of them coincide with each other, the smart card 48 is deemed as a right subscriber, and thus the random numbers $\{RNDb_1, \ldots, RNDb_m\}$ and the calculation results $\{SRESb_1, \ldots, SRESb_m\}$ from the smart card 48 are stored in the roamed network 31 so as to use in the main authentication as CR pairs (S1011). If one or more results do not coincide with each other, it is determined that the batch preliminary authentication fails, and then the results $\{SRESb_1, \ldots, SRESb_m\}$ are abandoned.

Since the sending order of the random number from the roamed network 31 has been rearranged, the smart card 48 cannot know that which of $\{RNDa_1, \ldots, RNDa_n, RNDb_1, \ldots, RNDb_m\}$ corresponds to the currently received random number. Therefore, if all the calculation results with respect to $\{RNDa_1, \ldots, RNDa_n\}$ coincide as aforementioned, not only the smart card 48 is considered as a right one but also a set of the CR pairs $\{RNDb_1, \ldots, RNDb_m\}$ and $\{SRESb_1, \ldots, SRESb_m\}$ are considered as legal CR pairs.

After succeeding the above-mentioned batch preliminary authentication of the smart card 48, the roamed network 31 can start the main authentication shown in FIG. 11 at any time when this smart card 48 requests roaming via the mobile station 35 and the radio interface.

When the smart card 48 requests roaming with his identification number via the mobile station 35, since the results of the preliminary authentication (CR pairs) $\{RNDb_1, \ldots, RNDb_m\}$ and $\{SRESb_1, \ldots, SRESb_m\}$ have already stored In the roamed network 31 (S1103), the network 31 sends one of the random numbers $RNDb_j$ of 64 bits to the mobile station 35. The mobile station 35 produces extended random number $RNDb'_j$ of 128 bits by applying the extension function E( ) to the received 64-bits random number $RNDb_j$ (S1104), and then sends this extended random number $RNDb'_j$ to the smart card 48. The smart card calculates $SRESb_j=f_{ki}(RNDb'_j)$ using the received $RNDb'_j$, its cipher function f and its secret key ki (S1105), and sends back the calculated result $SRESb_j$ of 32 bits to the roamed network 31 via the mobile station 35. The result of this calculation $SRESb_j$ is compared with the corresponding result $SRESb_j$ stored in the roamed network at the preliminary authentication stage (S1106). If they coincide with each other, the main authentication succeeds. Otherwise, it fails.

As will be apparent from the above-description, according to the present invention, roaming can be performed between networks which have different cipher functions for authentication and use random numbers of different bit length each other. In near future, many of smart cards which can share a part of authentication operation will be used for roaming to their visited networks. In such the case, if each of the mobile stations belonging to the visited networks has an appropriate function for extending the length of the random numbers, the smart cards can easily perform the roaming to any of their visited networks using random numbers of a shorter bit length than that in the smart cards.

Figure 12B:
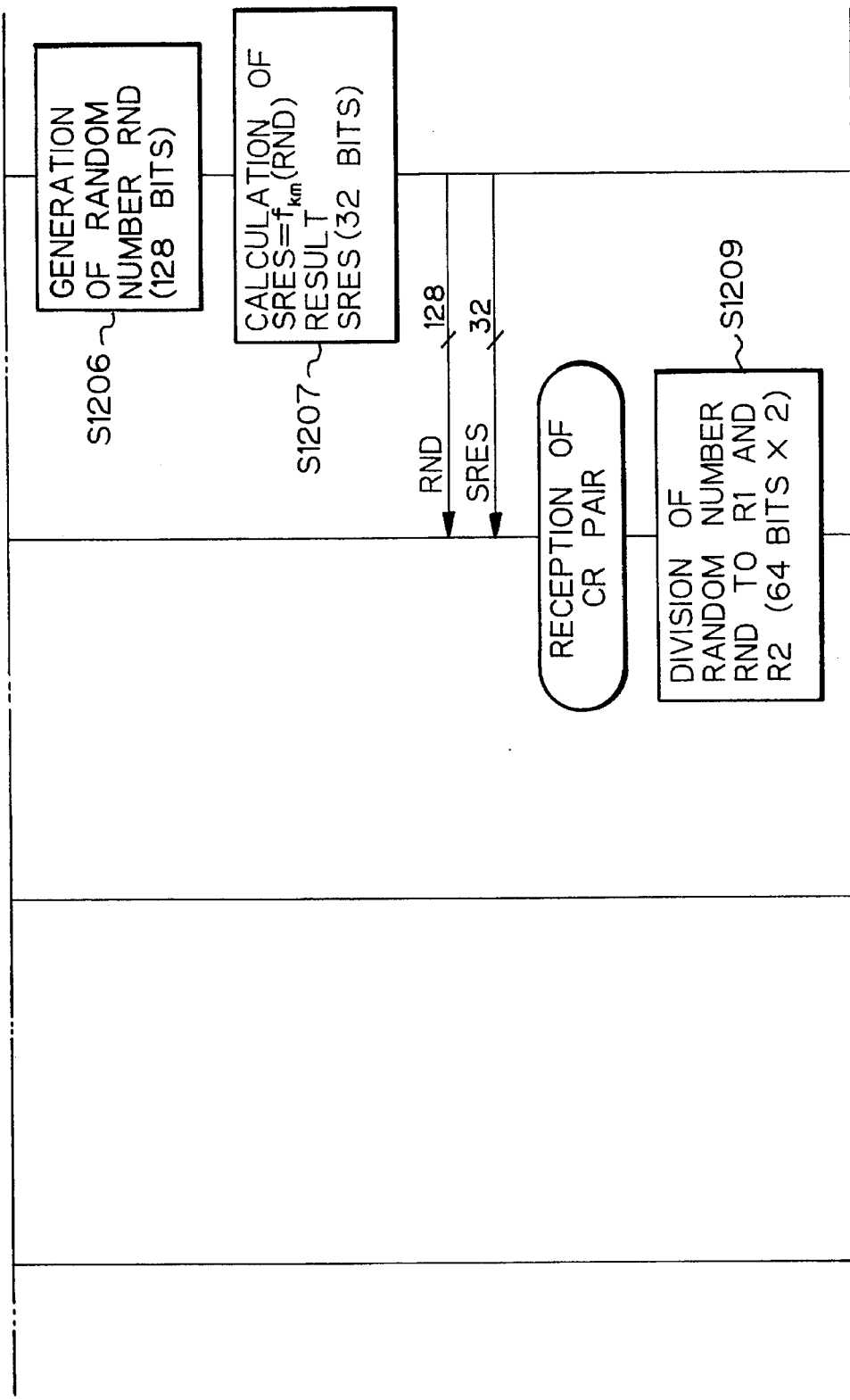
FIG. 12 which is illustrated in a separated form of FIGS. 12A, 12B and 12C is a flow chart showing the operation of an another embodiment according to the present invention.

FIG. 12 shows the operation of an another embodiment according to the present invention. The constitution of a mobile communication system and the constitution of a mobile station are also the same as these shown in FIGS. 3 and 4.

This embodiment concerns a mobile communication system having an authentication protocol wherein the roamed network 31 separately manages the mobile station 35 and the smart card 48, and wherein the radio interface between the roamed network 31 and the mobile station 35 is allowed to transmit only random numbers of for example 64 bits.

The authentication process in this embodiment consists of two stages of an authentication for the mobile station (mobile station authentication), and an authentication for the smart card (subscriber authentication). In this embodiment, furthermore, the mobile station belongs to this roamed network and thus it will be authenticated in accordance with the authentication process of this roamed network. Namely, the mobile station i (35) and the roamed network 31 (which is a home network for this mobile station) have the same cipher function g and the same secret parameter ki assigned to this mobile station (S1202, S1203). When a random number of 64 bits is received from the roamed network 31, the mobile station conducts a cipher calculation and then sends the result thereof TRES' to the roamed network. On the other hand, the smart card will be authenticated in accordance with the authentication process of the home network 30. Namely, the smart card m (48) and the home network 30 have the same cipher function f and the same secret parameter km assigned to this smart card (S1201, S1204). When a random number of 128 bits is received from the home network 30, the smart card conducts a cipher calculation and then sends the result thereof SRES' to the roamed network.

When the smart card 48 requests roaming to the roamed network 31 with its identification number via the mobile station 35, this roamed network 31 informs this with his identification number to his home network 30. The home network 30 then finds a secret key km corresponding to this smart card by retrieving its data base 34 (S1205), and generates a random number RND (S1206) of 128 bits. The home network 30 then calculates SRES=$f_{km}$(RND) using the generated RND and the found secret key km (S1207), and sends back a CR pair, namely the generated random number RND of 128 bits and the result of the calculation SRES of 32 bits, to the roamed network 31.

When the mobile station requests accessing to the roamed network 31 with its identification number, this roamed network finds a secret key ki corresponding to the mobile station by retrieving its data base 38 (S1208). After receiving the CR pair (RND, SRES) from the home network 30, the roamed network divides this received random number RND of 128 bits into two random numbers R1 and R2 of 64 bits (S1209).

The divided random number R1 of 64 bits is sent to the mobile station 35 as a random number for mobile station authentication. The mobile station stores the received R1 and calculates TRES'=$g_{ki}$(R1) by using the received random number R1, the cipher function g and his secret key ki (S1210). The calculated result TRES' of 32 bits is sent back to the roamed network 31.

The roamed network 31 calculates $g_{ki}$(R1) using the divided random number R1, the cipher function g and the found secret key ki, and confirms that its result $g_{ki}$(R1) is equal to the result TRES' calculated by and received from the mobile station 35 (S1211). Then, the roamed network 31 sends the other divided random number R2 of 64 bits to the mobile station 35. The mobile station 35 couples this random number R2 with the stored random number R1 to reproduce the random number RND of 128 bits, and sends it to the smart card as a random number for subscriber authentication. The smart card calculates SRES'=$f_{km}$(RND) by using the received random number RND, the cipher function f and his secret key km (S1212). The calculated result SRES' of 32 bits is sent back to the roamed network 31.

The roamed network 31 confirms that the stored result SRES is equal to the result SRES' calculated by and received from the smart card (S1213).

According to this embodiment, as above-described, a plurality of authentications are effected in the roamed network by using the divided random numbers which is divided to have a bit length appropriate to be used in this roamed network. The mobile network can use the random number having a longer bit length as that in the home network by coupling a plurality of the divided random numbers. In stead of generating the random numbers twice, a longer bit random number is divided into a plurality of random numbers with a shorter bit length according to this embodiment.

Although the authentication is performed twice in this embodiment, three or more times of authentication may be possible with the similar advantages.

Many widely different embodiments of the present invention may be constructed without departing from the spirit and scope of the present invention. It should be understood that the present invention is not limited to the specific embodiments described in the specification, except as defined in the appended claims.

What is claimed is:

1. A mobile communication authentication method for authenticating a mobile station which accesses for roaming a network different from a home network of the mobile station, said mobile station and said home network having the same secret key and using the same cipher function, said method comprising the steps of:

preliminarily authenticating said mobile station by sending from said home network to said roamed network, a plurality of pairs of first random numbers and calculation results of the cipher function, said calculation being performed at said home network using said secret key and said first random numbers, sending, from said roamed network to said mobile station, third random numbers formed by coupling second random numbers produced at said roamed network with said first random numbers, sending, from said mobile station to said roamed network, calculation results of the cipher function, said calculation being performed at said mobile station using said secret key and said sent third random numbers, and confirming, at said roamed network, coincidence of the calculation results sent from said mobile station with the calculation results sent from said home network; and authenticating said mobile station by using a pair of said second random number and of said calculation result with respect to the second random number, sent from said mobile station.

2. The method as claimed in claim 1, wherein the number of said first random numbers is smaller than that of said second random numbers.

3. The method as claimed in claim 1, wherein said third random numbers are sent from said roamed network in accordance with a sending order rearranged in random.

4. A mobile communication authentication method for authenticating a mobile station which accesses for roaming a network different from a home network of said mobile station, said mobile station and said home network having the same secret key and using the same cipher function, bit length of random numbers used in said roamed network being shorter than that used in said home network, said method comprising the steps of:

sending from said home network to said roamed network, calculation results of the cipher function, said calculation being performed at said home network using said secret key and random numbers extended by means of an extension function to the bit length of the random numbers used in said home network, sending, from said roamed network to said mobile station, random numbers before extension, sending, from said mobile station to said roamed network, calculation results of the cipher function, said calculation being performed at said mobile station using said secret key and random numbers extended by means of an extension function to the bit length of the random numbers used in said home network, and confirming, at said roamed network, coincidence of the calculation result sent from said mobile station with the calculation result sent from said home network.

5. The method as claimed in claim 4, wherein said mobile station and said roamed network have the extension functions, and wherein said roamed network produces random numbers and extends using said extension function bit length of the random numbers.

6. The method as claimed in claim 4, wherein said mobile station and said home network have the extension functions, and wherein said home network produces random numbers and extends bit length of the random numbers using the extension function.

7. The method as claimed in claim 4, wherein said extension function is a block cipher system of CBC mode.

8. A mobile communication authentication method for authenticating a mobile station which accesses for roaming a network different from a home network of said mobile station, said mobile station and said home network having the same secret key and using the same cipher function, bit length of random numbers used in said roamed network being shorter than that used in said home network, said method comprising the steps of:

preliminarily authenticating said mobile station by sending from said home network to said roamed network, a plurality of pairs of first random numbers and calculation results of the cipher function, said calculation being performed at said home network using said secret key and said first random numbers, sending, from said roamed network to said mobile station, third random numbers formed by coupling second random numbers produced and extended at said roamed network by means of an extension function to the bit length of the random numbers used in said home network with said first random numbers, sending, from said mobile station to said roamed network, calculation results of the cipher function, said calculation being performed at said mobile station using said secret key and said sent third random numbers, and confirming, at said roamed network, coincidence of the calculation results sent from said mobile station with the calculation results sent from said home network; and authenticating said mobile station by using a pair of said second random number and of said calculation result with respect to the second random number, sent from said mobile station.

9. The method as claimed in claim 8, wherein the number of said first random numbers is smaller than that of said second random numbers.

10. The method as claimed in claim 8, wherein said third random numbers are sent from said roamed network in accordance with a sending order rearranged in random.

11. A mobile communication authentication method for authenticating a smart card connected to a mobile station, which accesses for roaming a network different from a home network of said smart card, said smart card and said home network having the same secret key and using the same cipher function, bit length of random numbers used in said roamed network being shorter than that used in said home network, said method comprising the steps of:

preliminary authenticating said mobile station by sending from said home network to said roamed network, a plurality of pairs of first random numbers and calculation results of the cipher function, said calculation being performed at said home network using said secret key and said first random numbers, sending, from said roamed network to said smart card, third random numbers formed by coupling second random numbers produced and extended at said roamed network by means of an extension function to the bit length of the random numbers used in said home network with said first random numbers, sending, from said smart card to said roamed network, calculation results of the cipher function, said calculation being performed at said smart card using said secret key and said sent third random numbers, and confirming, at said roamed network, coincidence of the calculation results sent from said smart card with the calculation results sent from said home network; and authenticating said smart card connected to said mobile station by using a pair of said second random number and of said calculation result with respect to the second random number, sent from said smart card.

12. The method as claimed in claim 11, wherein the number of said first random numbers is smaller than that of said second random numbers.

13. The method as claimed in claim 11, wherein said third random numbers are sent from said roamed network in accordance with a sending order rearranged in random.

14. A mobile communication authentication method for authenticating a smart card connected to a mobile station, which accesses for roaming a network different from a home network of said smart card, said smart card and said home network having the same first secret key and using the same first cipher function, said mobile station and said roamed network having the same second secret key and using the same second cipher function, said method comprising the steps of:

authenticating said mobile station by sending, from said roamed network to said mobile station at least one random number, sending, from said mobile station to said roamed network, at least one calculation result of the second cipher function, said calculation being performed at said mobile station using said second secret key and the random number sent from said roamed network, and confirming, at said roamed network, coincidence of the calculation result sent from said mobile station with a calculation result calculated at said roamed network; and authenticating said smart card by sending from said roamed network to said smart card at least one random number, sending from said smart card to said roamed network, a least one calculation result of the first cipher function, said calculation being performed at said smart card using said first secret key and the random number sent from said roamed network, and confirming, at said roamed network, coincidence of the calculation result sent from said smart card with a calculation result sent from said home network.

15. The method as claimed in claim 14, wherein the random numbers sent from said roamed network to said mobile station are produced at said roamed network by dividing a random number sent from said home network.

* * * * *